United States Patent [19]

Scott

[11] 4,141,242

[45] Feb. 27, 1979

[54] APPARATUS FOR DYNAMICALLY TIMING A DIESEL ENGINE

[75] Inventor: Ronald K. Scott, Buda, Ill.

[73] Assignee: Caterpillar Tractor Co., Peoria, Ill.

[21] Appl. No.: 892,222

[22] Filed: Mar. 31, 1978

Related U.S. Application Data

[63] Continuation-in-part of Ser. No. 804,408, Jun. 7, 1977.

[51] Int. Cl.[2] .............................................. G01M 15/00

[52] U.S. Cl. ................................ 73/117.3; 73/119 A; 324/181

[58] Field of Search .................. 73/119 A, 116, 117.3; 324/181, 16 T; 364/431

[56] References Cited

U.S. PATENT DOCUMENTS

| | | | |
|---|---|---|---|
| 3,775,672 | 11/1973 | Letosky | 324/16 R |
| 3,815,411 | 6/1974 | Emerson | 73/117.3 |
| 4,015,466 | 4/1977 | Stick et al. | 73/116 |

*Primary Examiner*—Jerry W. Myracle
*Attorney, Agent, or Firm*—John L. James

[57] ABSTRACT

A timing method and timing apparatus are provided for dynamically timing an apparatus. The timing method includes operating the apparatus to be timed, and generating a signal having a zero crossover portion, and generating a timing signal in response to the signal reaching the zero crossover portion. The timing apparatus receives the signal and generates the timing signal in response to the signal reaching the zero crossover portion.

25 Claims, 24 Drawing Figures

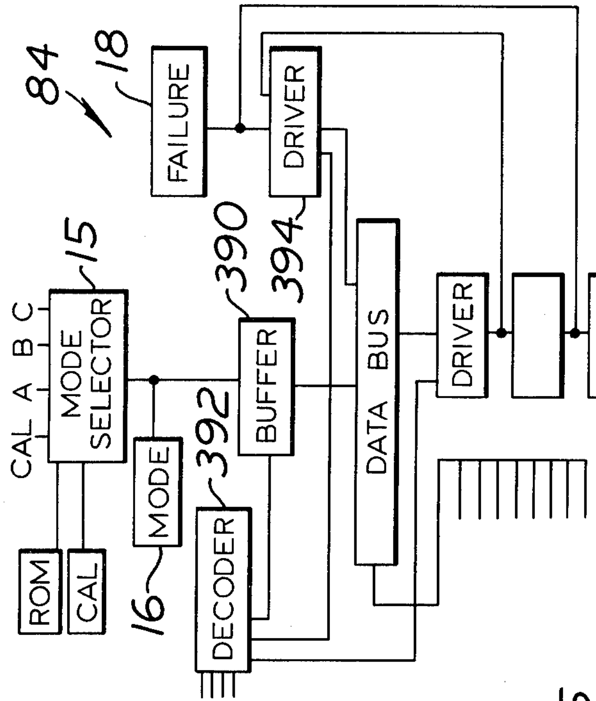
84
18
FAILURE
DRIVER
394
390
15
MODE SELECTOR
CAL A B C
BUFFER
392
MODE
16
ROM
CAL
DECODER
DATA BUS
DRIVER
LED
12
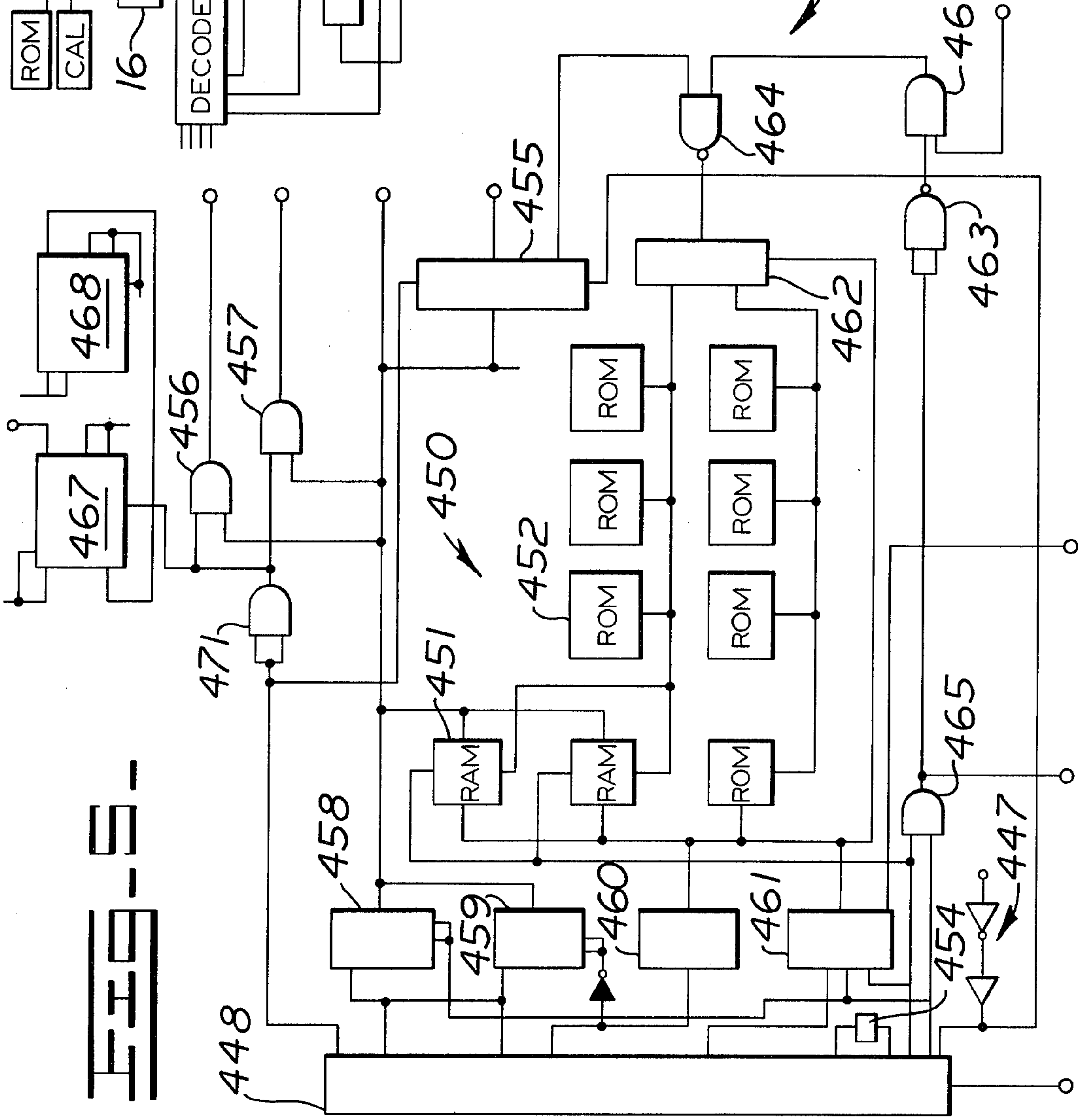
88
466
464
463
455
462
468
467
456
457
471
450
452
451
ROM
RAM
458
459
460
461
465
447
454
448

A
242
244
+5V
246
240
248
250
252
254
256
260
268
264
270
272
276
278
+5V
274
280
+5V
290
284
286
271
262
266
A
D
240'
+5V
+5V
274'
276'
-7V
252'
262'
271'
284'
134
-7V
360
-7V
330
P1-24
+5V
P1-26
-7V
332
G
318
A B
310
312
314
316
344
320
5 4 3 2
346
322
12 11 10 9
348
324
356
358
D
E
E
326
F
F
G

P1-25
P1-25
P1-23
P-47
P2-49
DIAGNOSTIC
REFERENCE
P2-47
+5V
-7V
F0
F1
F2
G
118
120
122
124
366
368
370
374
375
376
378
380
384
386
388

448
451
458
459
IC103
74LS14
NADS
HFLG/DB7
DFLG/DB6
IFLG/DB5
RFLG/DB4
AD15/DB3
AD14/DB2
AD13/DB1
AD12/DB0
NWDS
NRDS
+5V
BAD7
BAD6
BAD5
BAD4
BAD3
BAD2
BAD1
BAD0
BDB7
BDB6
BDB5
BDB4
BDB3
BDB2
BDB1
BDB0
CE2
R/W
OD
CE1
H
I 426
425
423
424
427
445
446
A34XX
SIN
-7V
+5V
P2-27
P1-39
P2-39
P1-41
P2-41
P1-43
P2-43
P1-45
P2-45
P1-31

APPARATUS FOR DYNAMICALLY TIMING A DIESEL ENGINE

BACKGROUND OF THE INVENTION

This application is a continuation-in-part of application Ser. No. 804,408 filed June 7, 1977.

This invention relates to a method and electronic measuring and testing equipment for measuring timing. The method and apparatus of this invention are well suited for timing and diagnosing engines, particularly fuel injected engines such as diesel engines.

Many mechanisms, such as automotive engines for example, have parts which cooperate in timed relation to produce a desired result. In conventional spark ignited engines the timed relationship, known as the timing angle, is easily defined as the angle the engine crankshaft rotates through from the moment of spark firing in a selected cylinder to the moment the piston in the selected cylinder reaches the top dead center position. In fuel injected engines, particularly diesel engines, the corresponding definition of timing is not as simple. It is known that ignition of the fuel mixture injected into a diesel engine cylinder occurs almost spontaneously with such injection, and that this can correspond to the spark in the spark ignited engine.

At present, for a diesel engine to be timed properly, a large number of mechanical relationships have to occur at precisely the proper time to make sure that the diesel fuel completes the path from the injection pump, through the fuel line, and through the injector into the cylinder at precisely the right time, so that the ignition of the diesel fuel will occur at the proper time to develop maximum power from the fuel injected into the cylinder. At the present time, timing of a diesel engine essentially takes the form of determining when diesel fuel will pass through the injector in relation to the top dead center of the No. 1 piston. Because the fuel injector will allow the fuel to pass into the cylinder when a certain pressure is built up in the fuel line coming to the injector, the diesel engine is essentially timed by rotating the crankshaft of the engine and noting when the pressure in the fuel line leading to the injector reaches this value.

This method of timing has the disadvantage of not detecting problems in the injector or fuel line. This method is also inaccurate because of the manner in which the top dead center of the piston is sensed. Top dead center is sensed by sensing a hole in the flywheel. The center of the hole represents the top dead center position; however, the edge of the hole is used for the timing measurement thereby introducing an error into the measurement. It is desirable to have a timing method which senses the center of the hole and does not introduce an error. It is also desirable to detect problems in the parts involved in the timing.

Timing is typically measured by a skilled mechanic trained in timing methods. However, even skilled mechanics sometimes make mistakes when using timing equipment which include incorrectly reading meter scales and not monitoring the various connections to the engine or other apparatus being timed. It is therefore desirable to have a timing system which eliminates the guesswork of reading meter scales and which eliminates monitoring the various connections to the device under test.

Timing measurements are normally performed in a shop environment under ideal conditions which is perfectly acceptable where the engine is undergoing scheduled maintenance. It is desirable to have a portable timing device for field use which diagnoses and isolates engine problems relating to timing thereby reducing machine downtime.

The energy crisis has helped create a need for more diesel engines and environmental concern has increased the need to measure timing on diesel engines very accurately and more quickly. Current electronic timing apparatus uses analog circuitry which does not provide the required speed accuracy for repeatedly making the measurements and computations required for timing an engine. It is therefore desirable to have timing apparatus which uses digital circuitry for determining the timing angle.

SUMMARY OF THE INVENTION

The present invention is directed to overcoming one or more of the problems as set forth above.

According to the present invention, a timing method and apparatus accurately determine the timing of an apparatus which cyclically generates a signal. The apparatus detects problems in components of the apparatus which generate the reference and timing signals.

The timing apparatus easily and accurately measures timing over a wide range of measurements and provides flexible modes of operation to identify faulty timing components.

The timing apparatus measures timing from any cylinder of an engine, measures signals after top dead center as well as before top dead center, and is portable and simple to operate.

BRIEF DESCRIPTION OF THE DRAWINGS

FIG. 5 is a block diagram of unit 2B of FIG. 2;

FIG. 9 is a partial schematic diagram of the circuitry of unit 2A of FIG. 2 and is connected to FIG. 8 at lines B—B;

DETAILED DESCRIPTION

Figure 1:
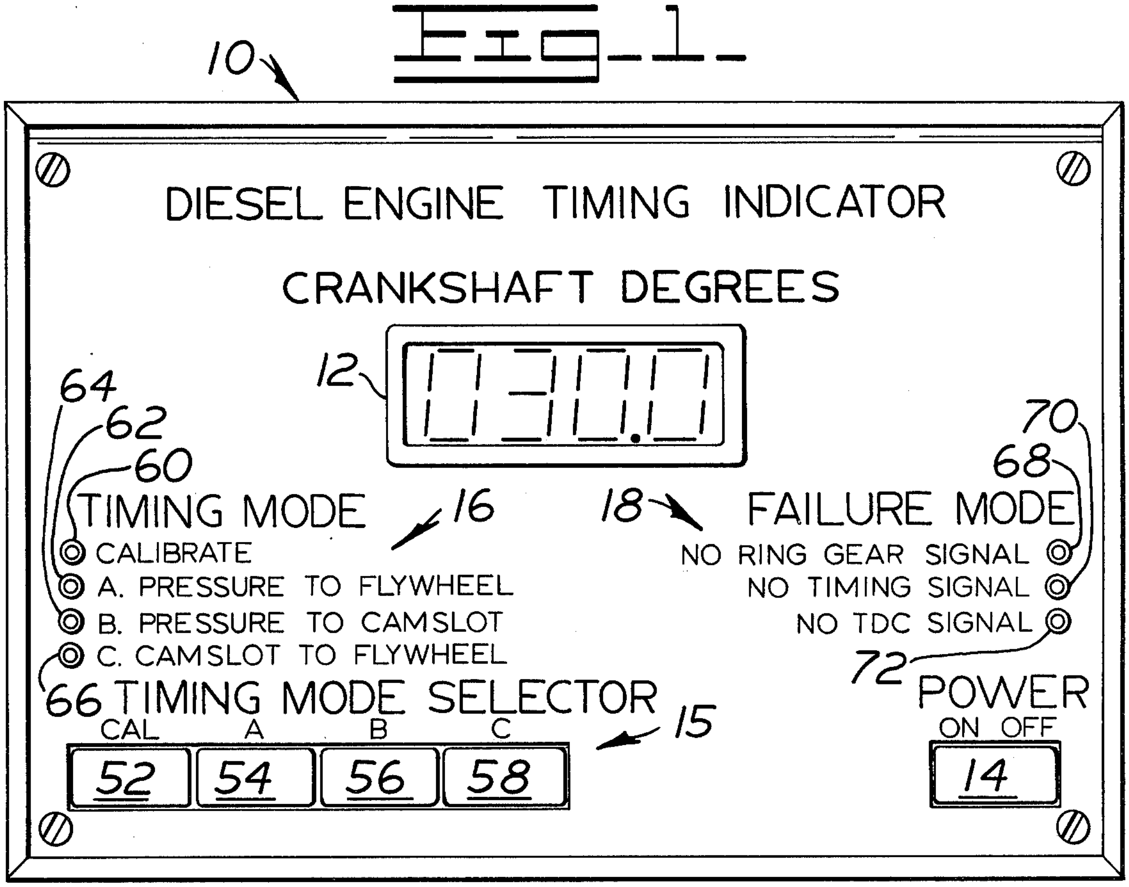
FIG. 1 is a diagrammatic view of the face of the timing apparatus of the present invention.

Referring to FIG. 1, a digital, dynamic timing indicator 10 has a scale 12 for indicating timing in positive and negative degrees to one decimal place. The timing indicator 10 has a power switch 14, a timing mode selector 15, a timing mode indicator 16 and a failure mode indicator 18.

Figure 2:
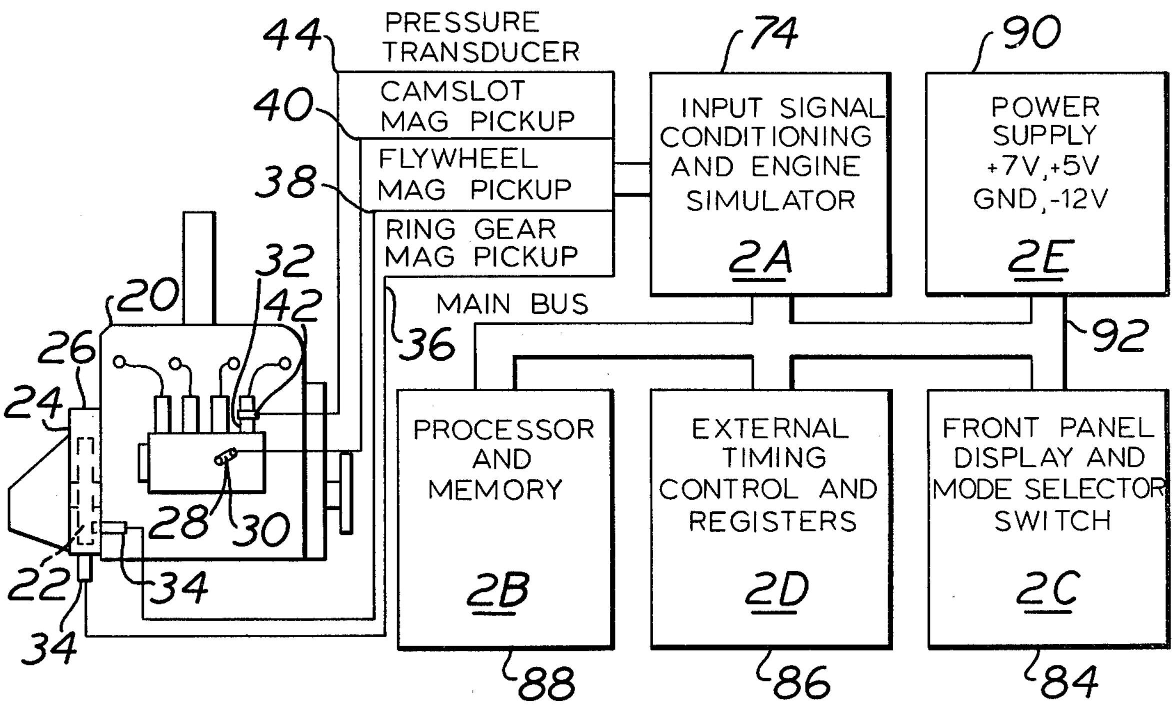
FIG. 2 is a block diagram of the timing apparatus divided into functional units and connected to an engine.

Referring to FIGS. 1 and 2, the timing indicator 10 is particularly well suited for timing a diesel engine 20. The diesel engine 20 preferably cyclically generates signals to be used for timing measurements. The engine 20 has a flywheel 22 with a slot or hole 22 therein and teeth 24 spaced about the periphery. The engine 20 also has a cam 28 with a slot or hole 30 therein and a plurality of fuel injectors 32.

Figure 3:
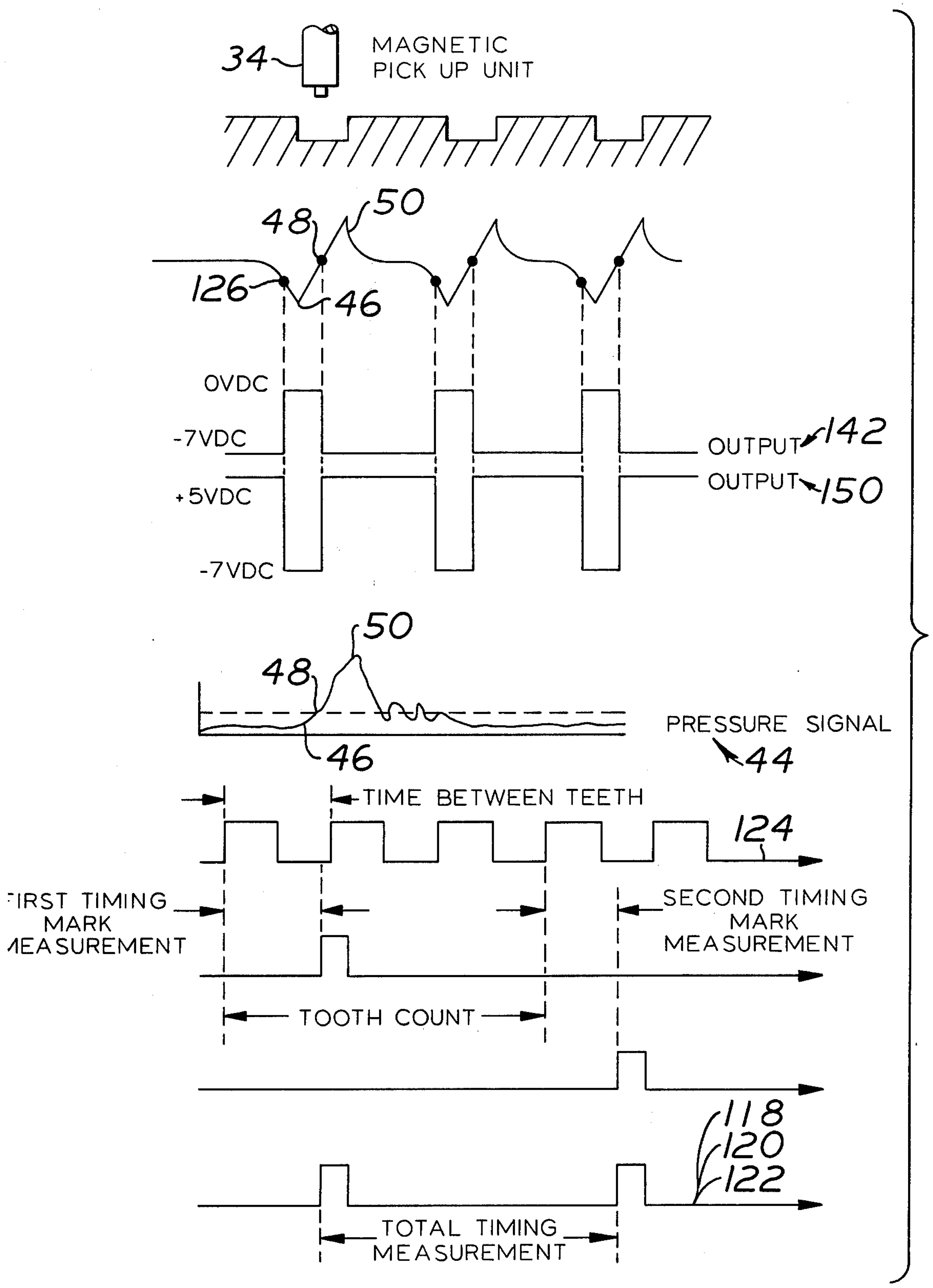
FIG. 3 is diagrammatic illustration of various input and output signals.

A transducer, such as a magnetic pickup unit 34, is used to sense the flywheel teeth 26, flywheel hole 24 and cam slot 30 and generates a reference signal 36, a flywheel hole signal 38 and a camslot signal 40 in response thereto (FIG. 3). A pressure transducer 36 is connected to the fuel injector 32 and generates a pressure signal 44 (FIG. 3). All of the reference and timing signals 36, 38, 40, 44 are cyclically generated and recur at regular intervals during operation of the engine 20. Thus, one cycle is considered as 360 degrees and angular timing measurements can be made.

Referring to FIG. 3, the reference and timing signals 36, 38, 40, 44 each have a negative portion 46, a zero crossover portion 48 and a positive portion 50. The flywheel hole signal 38, camslot signal 40 and pressure signal 44 are generated so that the negative portion 46 normally occurs before the positive portion 50. Because of the spacing of the flywheel teeth 26, the reference signal 36 approximates a sinusoidal signal. Any reference and timing signals from any source can be used for timing as long as the signals are cyclically generated oscillating signals. Where the signals oscillate but do not have a zero crossover portion, they can be mixed with a level signal to give an alternating signal which has a zero crossover portion. Naturally, the timing indicator 10 will operate correctly using any reference and timing signals regardless of their source.

Referring to FIG. 1, the timing mode selector 15 has four pushbutton switches 52, 54, 56, 58 labeled CALIBRATE, A, B, C, and the timing mode indicator 16 has four indicator lights 60, 62, 64, 66, preferably light emitting diodes, LED's. In the A mode timing is measured between the pressure signal 44 and flywheel hole signal 38, in the B mode timing is measured between the pressure signal 44 and camslot signal 40, and in the C mode timing is measured between the camslot signal 40 and flywheel hole signal 38. To choose the mode of operation one of the switches 52, 54, 56, or 58 is depressed and the corresponding light 60, 62, 64 or 66 is illuminated for visual checking. The failure mode indicator 18 has lights 68, 70, 72 which respectively indicate the loss of reference signal 36, camslot or pressure signals 40, 44 and flywheel hole signal 38. Thus, the timing indicator 10 with its timing mode indicator 16 and failure mode indicator 18 is useable by a mechanic to read timing and to diagnose problems which are directly indicated by a loss of signal. Where the mechanic knows what the timing angle should be, he is able to diagnose problems in the particular components that generate the timing signals by changing timing modes anc comparing the digital readout with manufacturing specifications. The timing indicator is made even simpler by the absence of a scale on which to read engine RPM when measuring timing.

Referring to FIG. 2, the timing indicator 10 is composed of five functional units each preferably arranged on a circuit board. A first unit 74 receives the reference and timing signals 36, 38, 40, 44 and produces digital reference and timing signals in response to the reference and timing signals 36, 38, 40, 44 substantially reaching the zero crossover portion 46 (FIG. 3). A second unit 84 selects two of the timing signals 38, 40, 44 and displays the timing angle therebetween in degrees of reference signal generation in decimal format. A third unit 86 measures the period of the digitized reference signal 76 and measures the time between the selected two digitized timing signals 38, 40; 38, 44; or 40, 44. A fourth unit 88 is coupled to the first, second and third units 74, 84, 86 and automatically controls operation of second and third units 84, 86. A fifth unit 90 provides power in the form of −12VDC, −7VDC, OVDC Gnd, and +5VDC for the other four units 74, 84, 86, 88. A main bus line 92 interconnects the five units 74, 84, 86, 88 and 90.

Figure 4:
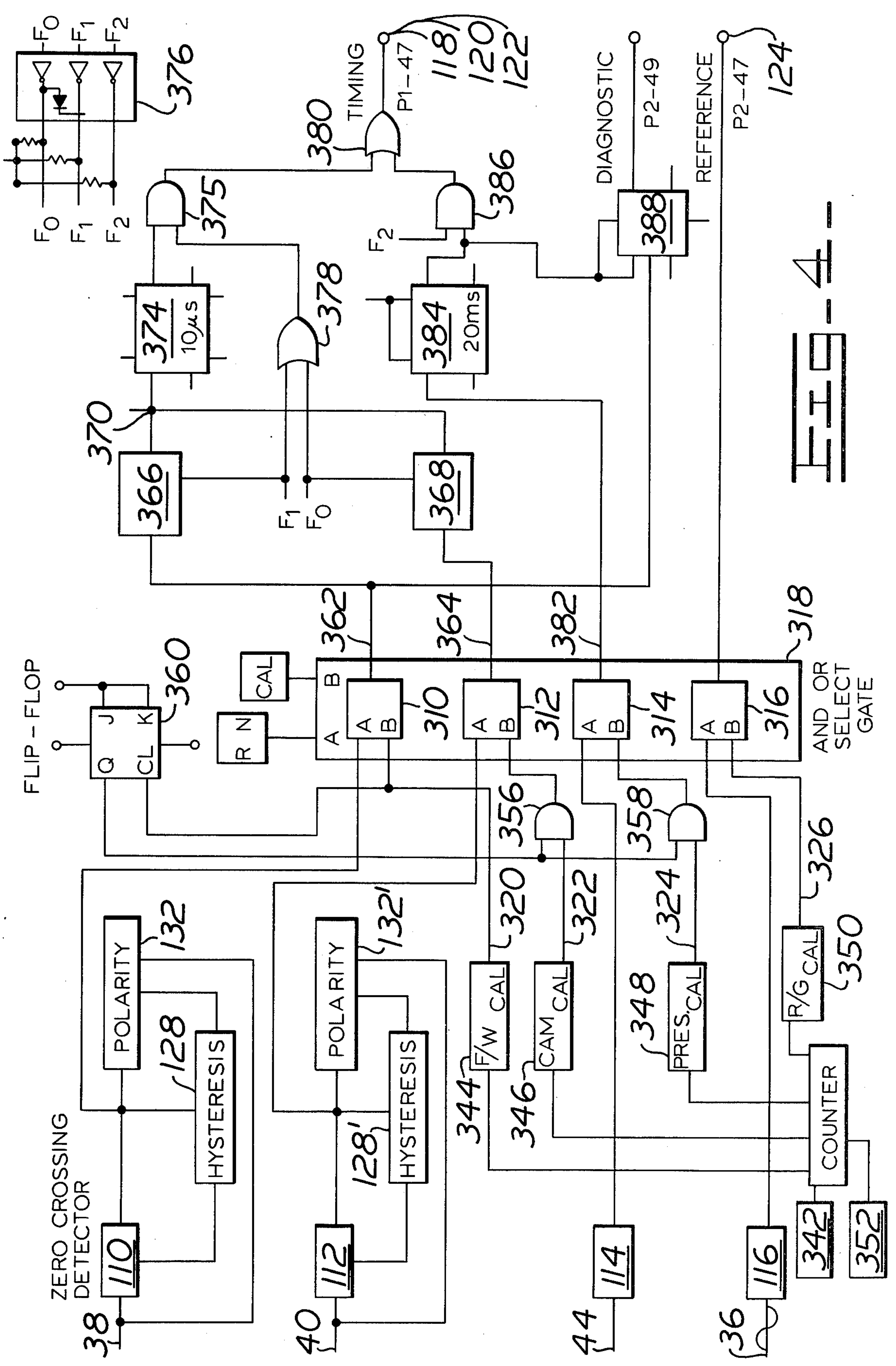
FIG. 4 is a block diagram of unit 2A of FIG. 2.
Figure 7:
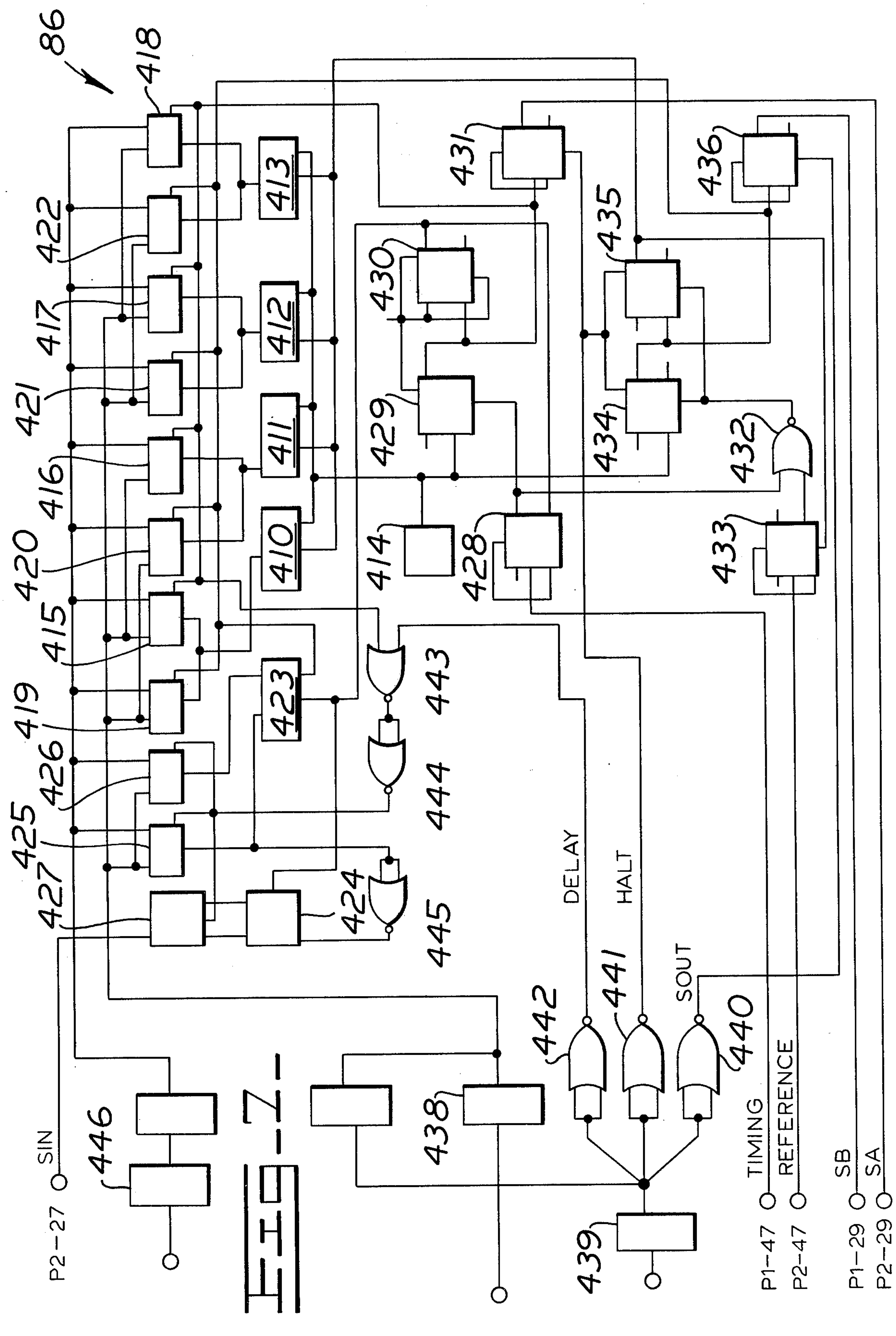
FIG. 7 is a block diagram of unit 2D of FIG. 2.

Referring to FIG. 4, the first unit 74 contains four zero crossing detectors 110, 112, 114, 116 for receiving each of the timing and reference signals 38, 40, 44, 36, initiating timing and reference pulses 118, 120, 122, 124 in response to the respective timing and reference signals reaching a negative threshold voltage level 126, and terminating the pulses 118, 120, 122, 124 in response to the respective signals 38, 40, 44, 36 substantially reaching the zero-crossover portion 48 during changing of the signals from the negative portion 46 to the positive portion 50 (FIG. 3). Two of the zero crossing detectors 110, 112 are each connected to an automatic hysteresis control 128, 130 for noise control and a polarity checker 132, 134. The third zero crossing detector 114 has a fixed hysteresis since the noise level produced by pressure vibrations are never at ground potential and thus does not require a polarity checker either. The fourth zero crossing detector 116 also has a fixed hysteresis level because reference signal 36 which is received approximates a sine wave signal which never stays near ground potential. Since the reference signal 36 approximates a sine wave signal, a polarity checker is not required.

Referring to FIGS. 4 and 8–11, the zero crossing detectors 110, 112, 114, 116, the hysteresis controls 128, 130 and polarity checkers 132, 134 are shown in detail. The integrated circuits and other components used herein are all manufactured by National Semiconductor Corporation unless specified otherwise. Since all of the zero crossing detectors, hysteresis controls and polarity checkers are similar, only one of each will be described in detail, all of the others being similar in construction and operation.

The components of the zero-crossing detectors 112, 114, 116 are designated by "'", "''", and "'''" numbers respectively. The components of the hysteresis control 130 and polarity checker 134 are likewise designated by "'" numbers.

Figure 8:
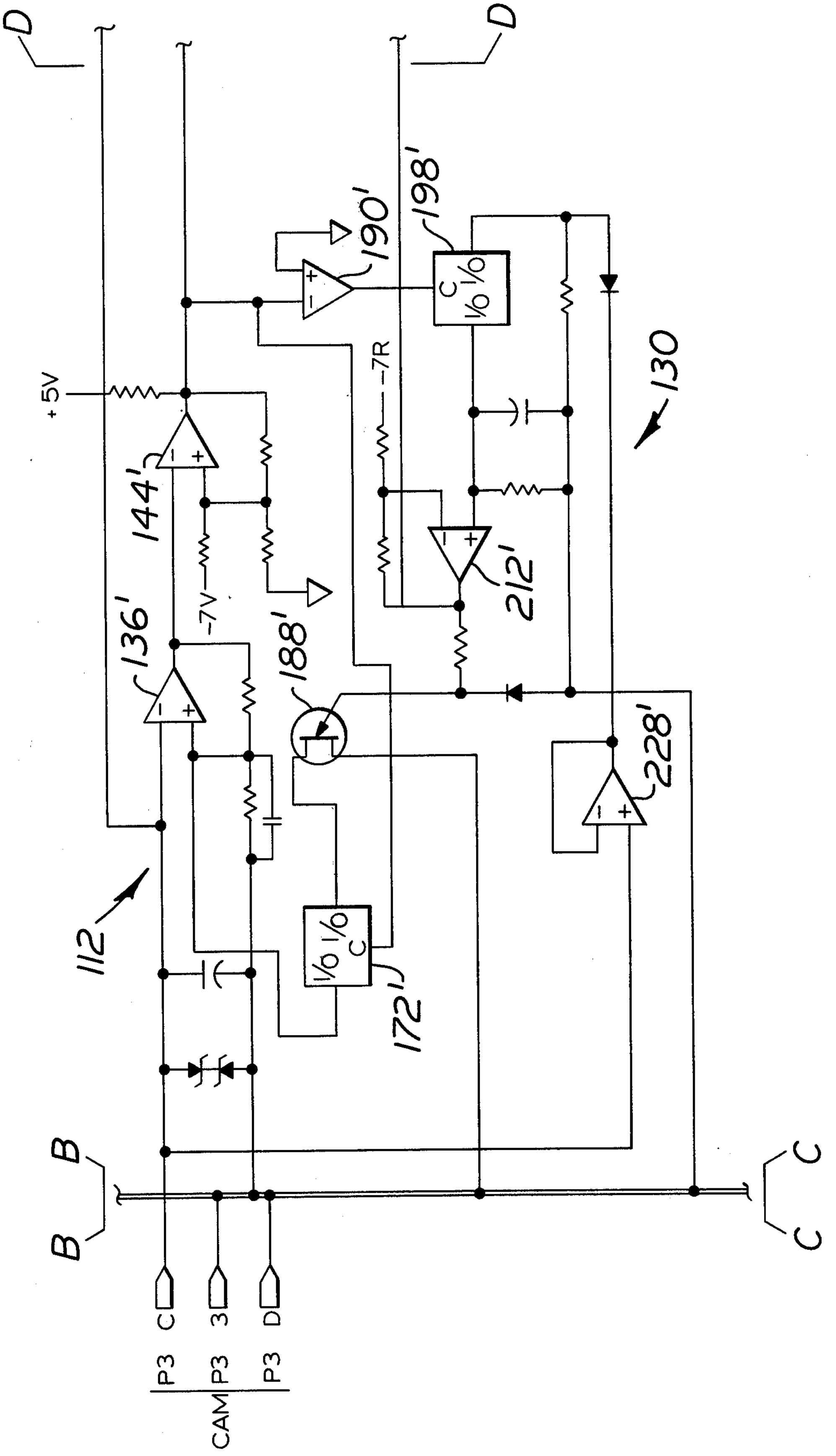
FIG. 8 is a partial schematic diagram of the circuitry of unit 2A of FIG. 2.
Figure 10:
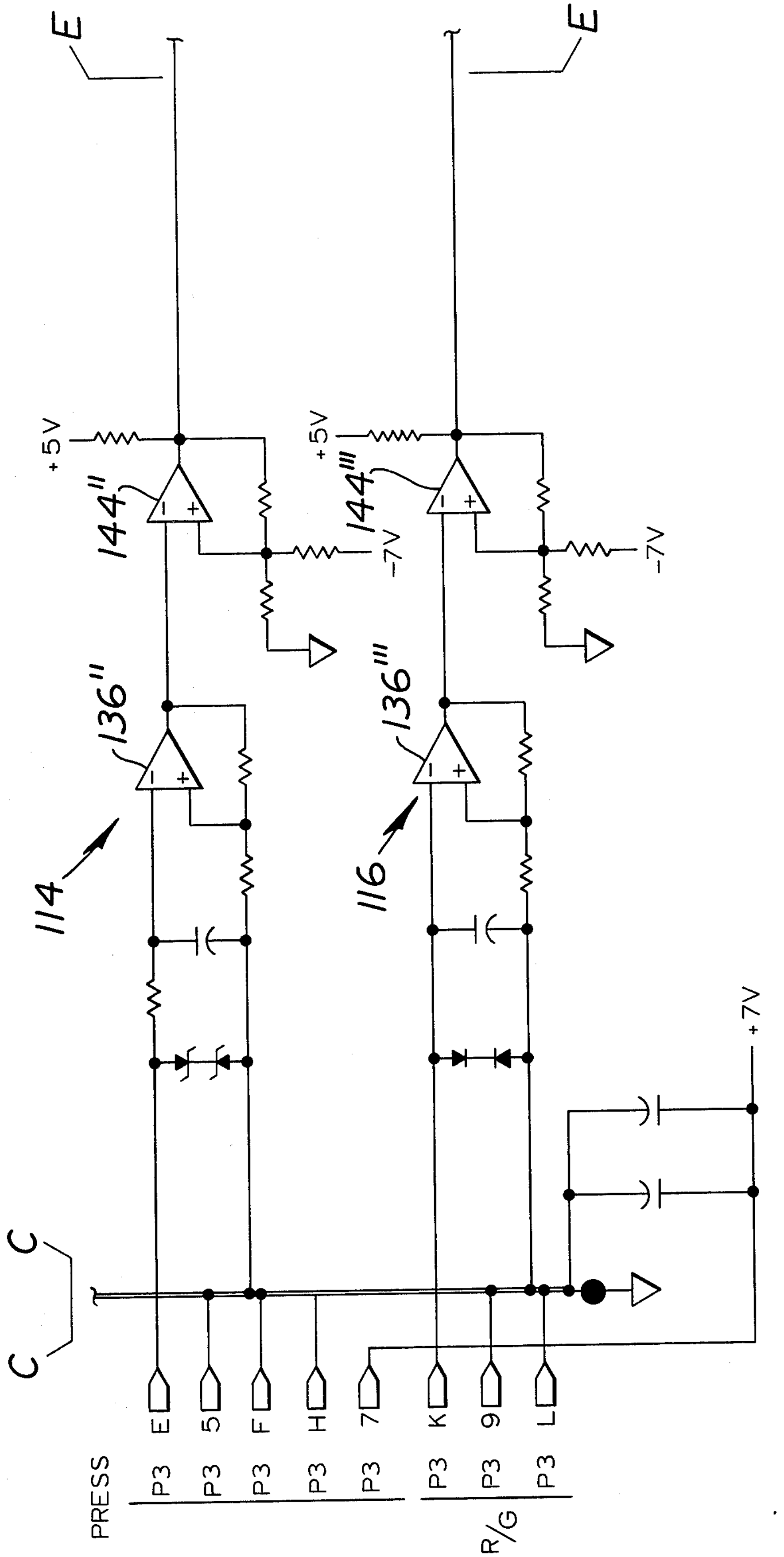
FIG. 10 is a partial schematic diagram of the circuitry of unit 2A of FIG. 2 and is connected to FIG. 9 at C—C.

Referring to FIG. 8, the zero crossing detector 110 includes a first operational amplifier 136 having a signal input 138, a reference input 140, and an output 142; and a second operational amplifier 144 having a signal input 146 connected to the output 142 of the first operational amplifier 136, a reference input 148, and an output 150. The output 142 is coupled to the reference input 140 by a resistor 152. A second resistor 154 is connected at one end to the resistor 154 and reference input 140 and at the other end to a single point ground buss 156.

The single point ground buss 156 is also the ground connection point for the reference and timing signals 36, 38, 40, 40 which each have a shield and common lead connected to the single point buss 156 and a signal lead connected to a respective signal input 138. By this construction, problems associated with floating grounds on the input signals is avoided.

The zero crossing detector 110 also includes a capacitor 158 and back-to-back zener diodes 160, 162 for limiting the input signal 38 to preselected minimum and maximum magnitudes. The capacitor 158 is connected to the signal input 138 of the first operational amplifier 136 and to the single point ground buss 156. The back-to-back diodes 160, 162 are connected in parallel with the capacitor 158.

The output 150 of the second operational amplifier 144 is coupled to the +5VDC reference by a resistor 164 and is coupled to the reference input 148 by a resistor 166. The reference input 148 is coupled to the −7VDC reference by resistor 168 and to 0VDC Gnd by resistor 170. The output 150 which is also the output of the zero crossing detector 110 switches from +5VDC to −7VDC when the flywheel hole signal 38 reaches the negative threshold voltage 126 and switches from −7VDC to +5VDC when the signal 38 substantially reaches the zero crossover portion 46 during the transition from the negative portion 46 to the positive portion 50 (FIG. 3). By this construction, a pulse is generated which swings from −7VDC to +5VDC at the zero crossover point 48 and switches back to −7VDC at the threshold point 126.

The automatic hysteresis control 128 includes a first analog switch 172 which has a control input 174 connected to the zero-crossing detector output 150, a signal input 176, and an output 178 connected to the reference input 140 of the first operational amplifier 136.

A unijunction transistor 182 has a first base 184 connected to the signal input 176 of the first analog switch 172, a second base 186 connected to the single point ground buss 156, and an emitter 188.

A first diode 189 is connected to the emitter 188 and the single point ground buss 156.

A first operational amplifier 190 has a signal input 192 connected to the zero crossing detector output 150, a reference input 194 connected to ground, and an output 196.

A second analog switch 198 has a control input 200 connected to the output 196 of the first operational amplifier 190, a signal input 202, and an output 204 coupled to the signal input 202 by first and second series resistors 206, 208. A capacitor 210 is connected at one end to the output 204 and at the other end to the single point ground buss 156 and first diode 189 and is in parallel with the first resistor 206 and in series with the second resistor 208.

A second operational amplifier 212 has a signal input 214 connected to the output 204 of the second analog switch 198, a reference input 216 coupled to the −7VDC reference by a resistor 218, and an output 220 coupled to the reference input 216 by a resistor 22. The output 220 is coupled to the first diode 189 and emitter 188 of the unijunction transistor 182 by a resistor 224.

A capacitor 226 is connected to the output 178 of the first analog switch 172 in parallel with the resistor 154 and functions as a spike suppressor. The capacitor 226 is connected to the reference input 140 of the first operational amplifier 136 of the zero crossing detector 110 and to the single point ground buss 156.

A third operational amplifier 228 has a signal input 230 connected to the signal input 138 of the zero crossing detector 110, an output 232 and a reference input 234 connected to the output 232.

A second diode 236 is connected to the output 232 of the third operational amplifier 228 and to the signal input 202 of the second analog switch 198.

When the input signal 38 goes negative, reaches the threshold voltage level 126 and passes through the zero crossover point 48, the zero crossing detector output 150 swings from −7VDC to +5VDC. The output 150 is inverted by the first amplifier 190 to enable analog switch 190 which charges the capacitor 210 to the negative peak voltage of the input signal 38. The peak voltage of the capacitor 210 controls the second amplifier 212 which adjusts the unijunction transistor 182 to the proper threshold voltage. As the peak voltage of the input signal 38 increases or decreases, the threshold level 126 follows. By this construction, the effects of noise are minimized.

Figure 11:
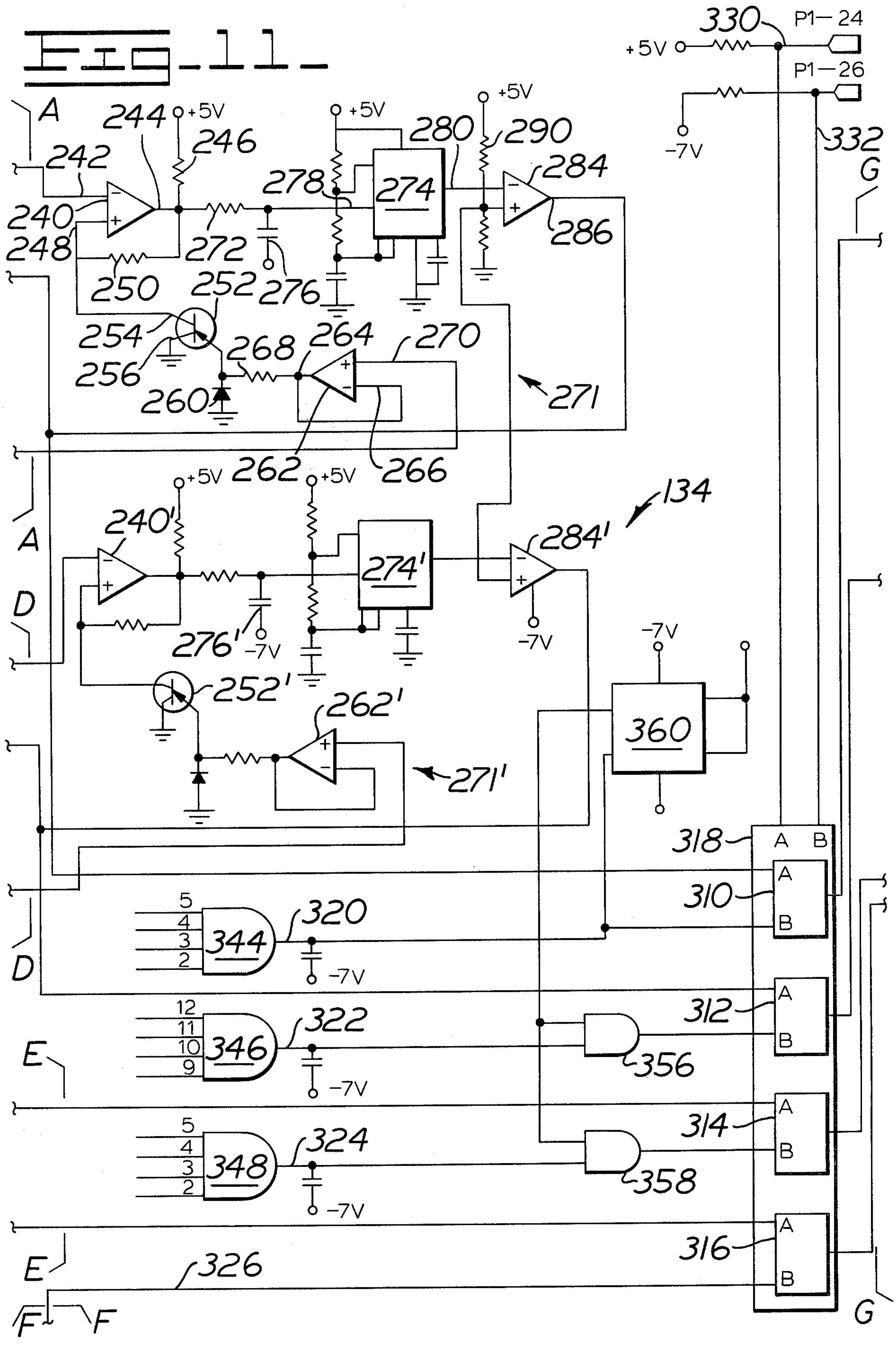
FIG. 11 is a partial schematic diagram of the circuitry of unit 2A of FIG. 2 and is connected to FIG. 8 at line A—A, to FIG. 9 at line D—D; and to FIG. 10 at line E—E.

Referring to FIG. 11, the polarity checker 132 includes a first operational amplifier 240 which has a signal input 242 connected to the input 138 of the zero crossing detector 110, an output 244 coupled to the +5VDC reference by a resistor 246, and a reference input 248 coupled to the output 244 by a resistor 250.

A unijunction transistor 252 has a first base 254 connected to the reference input 248, a grounded second base 256, and an emitter 258 coupled to ground by a diode 260. A second operational amplifier 262 has an output 264 connected to a reference input 266 and coupled to the emitter 258 by a resistor 268, and a signal input 270 connected to the output 212 of the second operational amplifier 212 of the automatic hysteresis control 128. The unijunction transistor 252 and second operational amplifier 262 comprise an automatic hysteresis control 271 for the polarity checker 132.

The output 244 of the first operational amplifier 240 is coupled by a resistor 272 to an oscillator 274, such as a 555 timer. A charging capacitor 272 is connected at one end to −7VDC and at the other end to the resistor 272 and input 278 to the oscillator 274. The oscillator output 280 is received by the signal input 282 of a third operational amplifier 284 which has an output 286 connected to the output 150 of the zero crossing detector 110. A reference input 287 is coupled to ground by a resistor 288 and coupled to +5VDC by a resistor 290.

The input signal 38 is simultaneously applied to the zero crossing detector 110, the polarity checker 132 and the automatic hysteresis control 128. The first operational amplifier 136 receives the input signal 38, compares it with the reference input 140 and delivers an output 142 when the input signal 36 reaches the threshold voltage 126 which is about −0.3VDC. When the flywheel hole 24 starts to come by the magnetic pickup unit 34, the input signal 38 goes negative and when the threshold voltage 126 is reached, the output 142 goes high to 0VDC. This output 142 is essentially an open collector output which is floating to ground. The output 142 is inverted and level translated by the second operational amplifier 144 which provides a negative pulse of full swing from +5VDC to −7VDC.

As the flywheel hole 24 continues past the magnetic pickup unit 34, the input signal 36 ceases the negative journey and goes in the positive direction toward zero. As the center of the hole 24 passes the center of the magnet of the pickup unit 34, the signal 36 is substantially at zero. By substantially at zero, it is meant that the signal 36 is at exactly zero or as close to zero as is humanly and electronically possible in this measuring situation. One skilled in the art would know that the size of the hole 24 relative to the magnet of the pickup unit 24 influences where the signal 36 will be zero. The speed of the hole 24 passing the pickup unit 34 is also a factor. In a preferred embodiment the hole 24 was about ⅜ inch wise (9.525 mm) and 0.060 inch deep (1.52 mm) with the top of the hole spaced about ⅛ inch (3.175 mm) from the magnet of the pickup unit and moved past the pickup unit at speeds in the range of 32.6 - 326 Km/hour or engine speeds in the range of 400 - 4000 rpm. Other speeds are attainable by varying the spacing between the hole 24 and pickup unit 34 as is well known in the art.

When the signal 36 reaches the zero crossover portion 48, the output 142 goes low to −7VDC and stays low until the signal 36 again goes negative and reaches the threshold voltage 126. The output 150 swings from +5VDC to −7VDC when the output 142 swings from −7VDC to 0VDC and swings from −7VDC to +5VDC when the output 142 swings from 0VDC to −7VDC. By this construction, a positive pulse initiated in response to the input signal 36 substantially reaching the zero crossover portion 38 and terminated in response to the input signal 36 reaching the threshold voltage 126.

The threshold voltage at the reference input 140 of the first operational amplifier 136 is controlled by the automatic hysteresis control 128 which turns on the unijunction transistor 182 fully such that the threshold voltage at the reference input 140 is about −0.3VDC. This is the maximum voltage at which the zero crossing detector 110 will trigger.

The output 150 of the second operational amplifier 144 is inverted by amplifier 190 to enable the analog switch 198 which charges the capacitor 210 to the negative peak voltage of the input signal 36. The peak voltage controls the amplifier 212 which adjusts the unijunction transistor 182 to the desired threshold voltage. As the peak voltage of the input signal 38 increases or decreases, the threshold level follows.

The polarity of the input signal 38 is detected by the operational amplifier 240. The automatic hysteresis control 271 turns on the unijunction transistor 252 fully such that the threshold voltage at the reference input 248 is about −0.3VDC. When the input signal 38 goes negative and reaches the threshold voltage 126, the output 244 of the operational amplifier 240 goes high. This transition will begin to charge the capacitor 276, but the output 244 will go low again before the capacitor 276 charges up enough to turn on the oscillator 274, which is about an 0.08 HZ oscillator. This polarity is correct and the timing indicator 10 will operate correctly.

When the input signal 38 goes positive, the output 244 will go low when the threshold voltage is reached, but as soon as the input signal 38 starts low and reaches the threshold level, the output 244 goes high and stays high until the input signal goes high again. This allows the capacitor 276 to charge up to about +5VDC. As long as the oscillator input 278, which is connected to the capacitor 276, is high the oscillator 274 will oscillate. The oscillator output 280 is inverted and level changed by the amplifier 284. The duty cycle is set so that the timing indicator scale 12 will become blank and the failure mode indicator 18 will flash the appropriate light 70,72 for a second or more. The operator or mechanic is alerted by this light blinking that the polarity is reversed.

Referring to FIG. 11, the outputs of the zero crossing detectors 110, 112, 114, 116 are connected to first, second, third and fourth gates 310, 312, 314, 316 of an AND/OR select gate 318. The four gates 310, 312, 314, 316 are respectively coupled to the outputs 320, 322, 324, 326 of a signal simulator, preferably an engine simulator 328 for calibration purposes. The calibration switch 52 (FIG. 17) is connected to the AND/OR select gate 318 via lines 330, 332 and enables the timing signals 110, 112, 114, 116 through line 338 in the run mode and enables the simulated signals 320, 322, 324, 326 through line 332 in the calibration mode.

Figure 12:
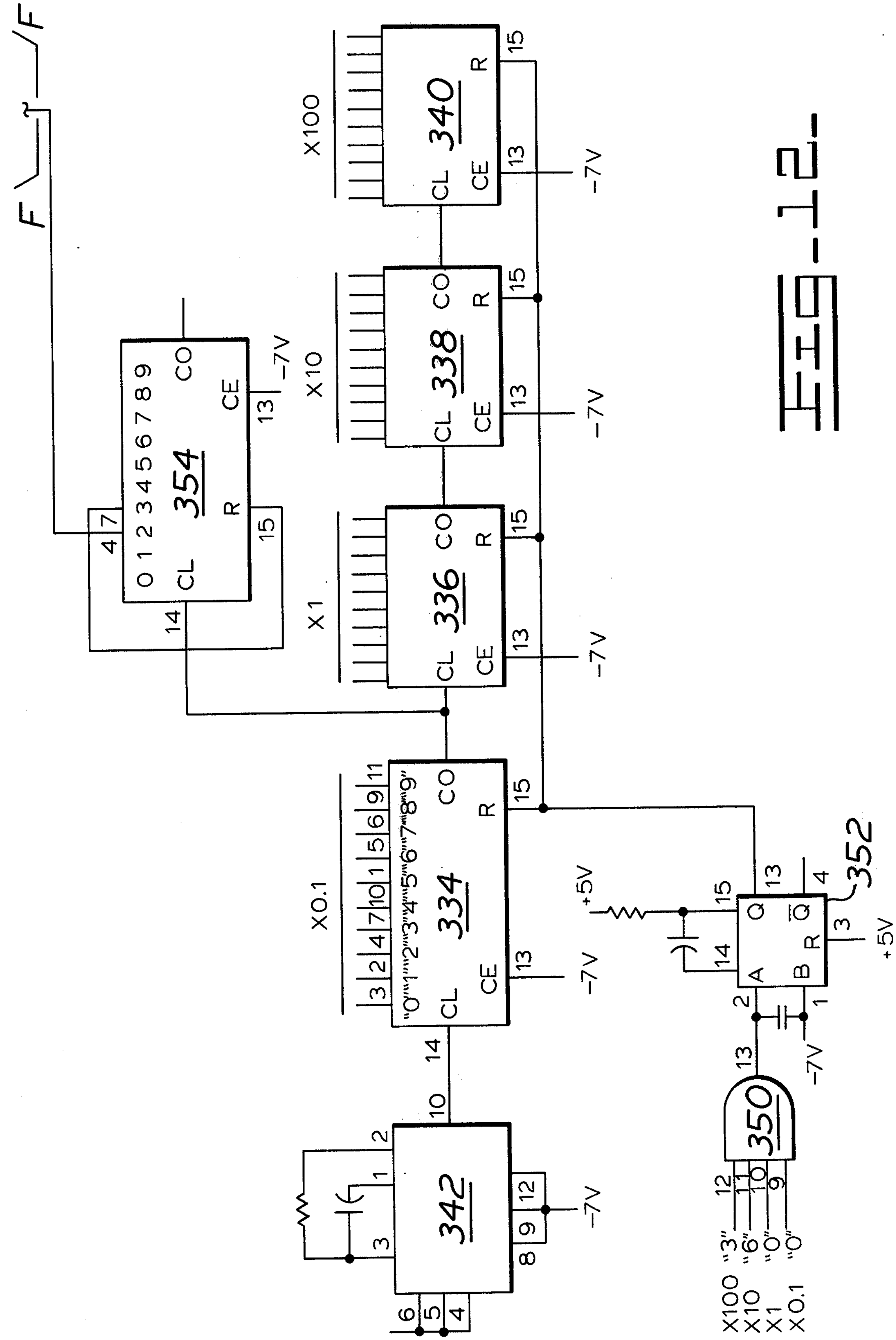
FIG. 12 is a partial schematic diagram of the circuitry of unit 2A of FIG. 2 and is connected to FIG. 11 at line F—F.

Referring to FIGS. 11 and 12, the engine simulator 328 produces timing signals of common values to check the calibration of the timing indicator 10. The signals are generated by four decade counters 334, 336, 338, 340 which count up to 3600 and reset to simulate 360.0 degrees of rotation in tenth of a degree increments. The four counters are driven by a 60 KHZ oscillator 342 to simulate an engine speed of 1200 rpm.

Four AND gates 344, 346, 348, 350 sense counts representing different timing angles. Three AND gates 344, 346, 348 deliver the outputs 320, 322, and 324, respectively. The fourth AND gate 350 senses counts representing 360.0 and controls a flip-flop 352 which resets the counters to zero.

A fifth decade counter 354 is connected to the first and second counters 334, 336 and to the fourth gate 316 to simulate the flywheel tooth count.

The outputs 320, 326 are connected to gates 310, 316 and outputs 322, 324 are coupled to gates 314, 314 by AND gates 356, 358. The output 320 is also connected to a toggle flip-flop 360 which has an output connected to the AND gates 356, 358. The toggle flip-flop 360 is used to disable the simulated pressure and camslot signals 324, 322 so that the simulated signals occur only every other revolution as the real signals would occur in a typical engine.

The internal calibration of the timing indicator 10 is checked by pressing the calibration pushbutton 52 in conjunction with mode button A, B or C, 54, 56 or 58 which causes the scale 12 to indicate 120, or the appropriate number of flywheel teeth 26 simulated by the engine simulator circuitry 328, in all three modes. The scale 12 should then change to 30.0 degrees for mode A, 28.5 degrees for mode B, or 1.5 degrees for mode C depending upon which button 54, 56 or 58 is depressed.

Figure 13:
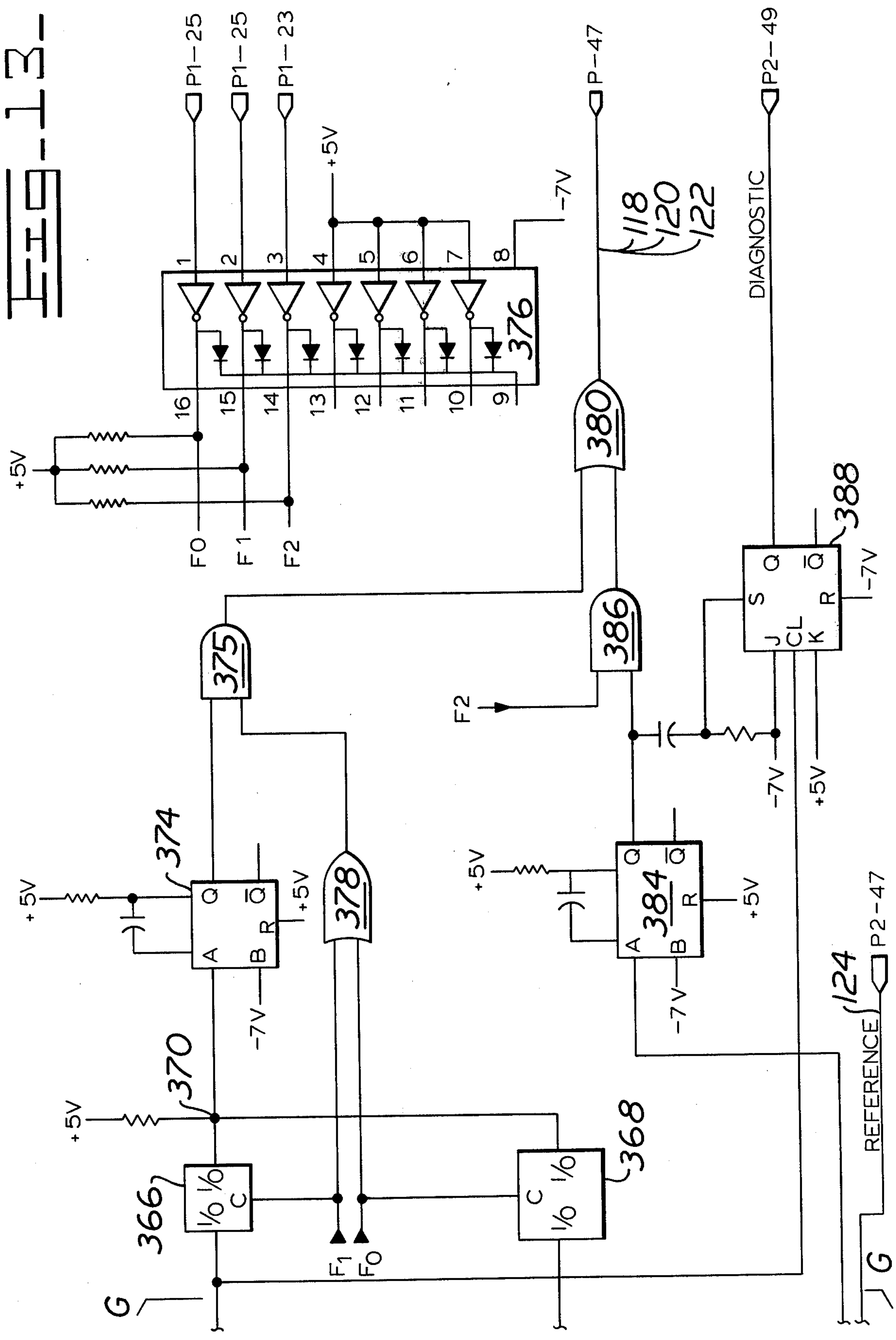
FIG. 13 is a partial schematic diagram of the circuitry of unit 2A of FIG. 2 and is connected to FIG. 11 at line G—G.
Figure 14:
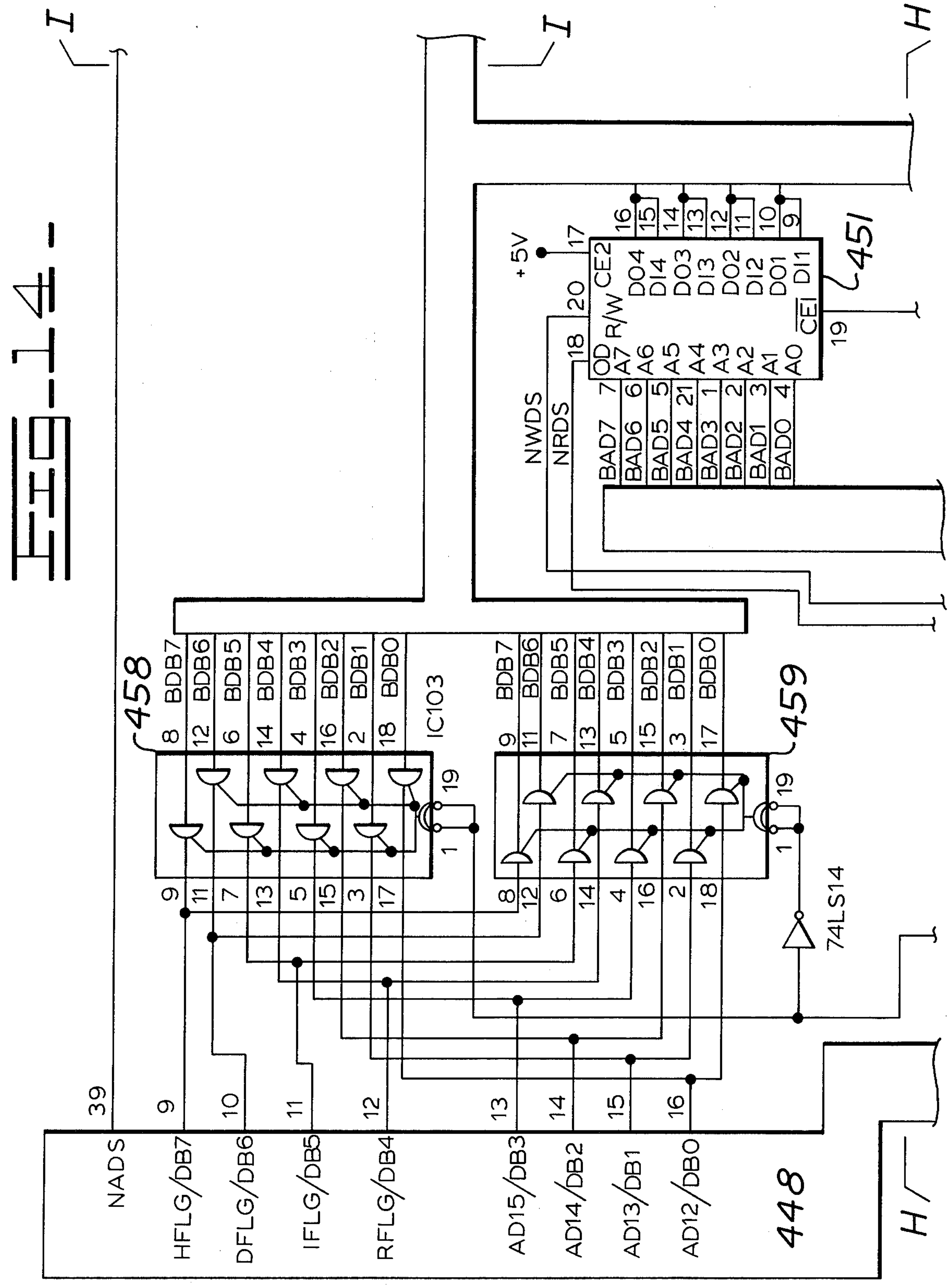
FIG. 14 is a partial schematic diagram of the circuitry of unit 2B of FIG. 2.
Figure 15:
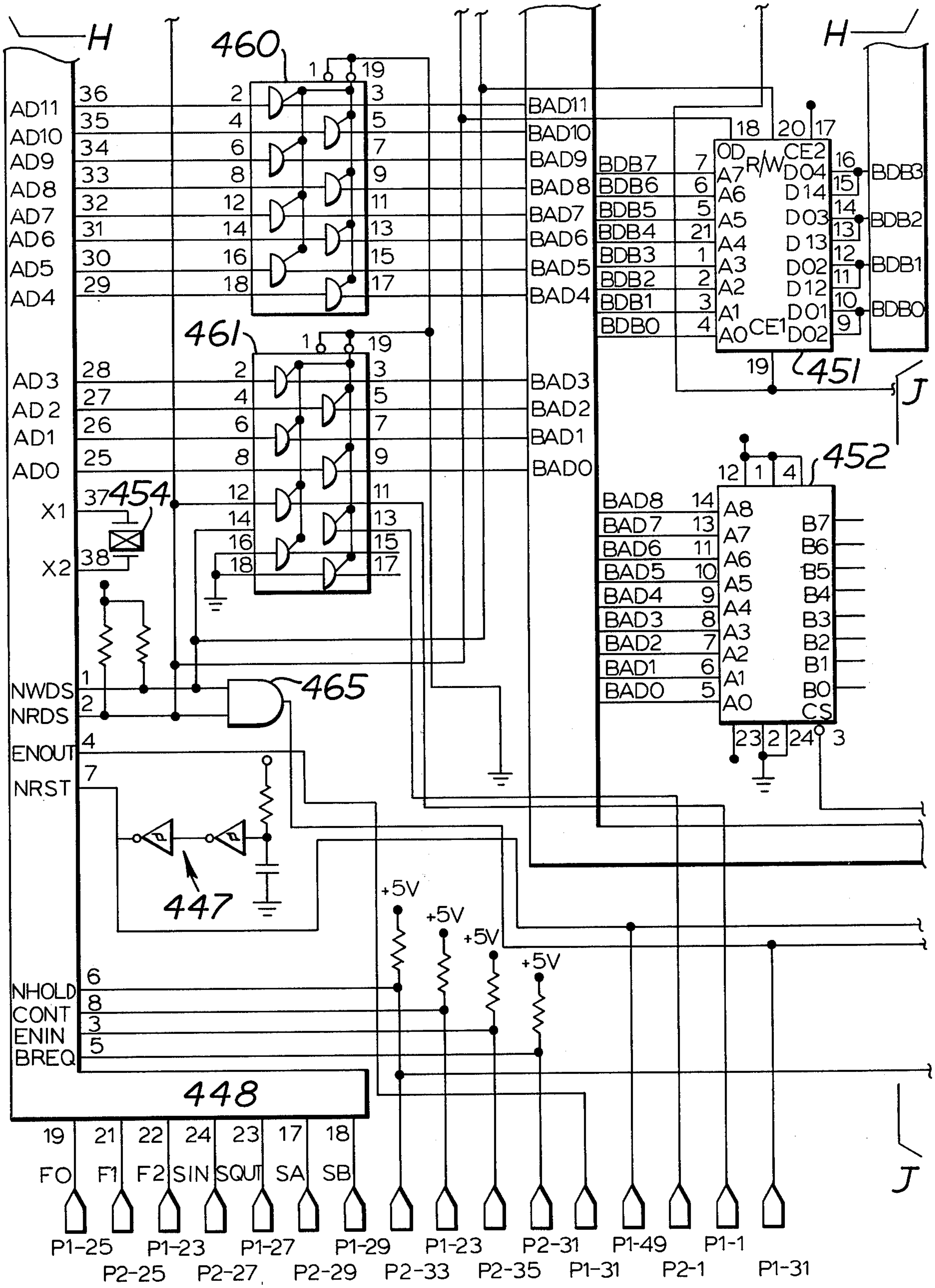
FIG. 15 is a partial schematic diagram of the circuitry of unit 2B of FIG. 2 and is connected to FIG. 14 at line H—H.
Figure 16:
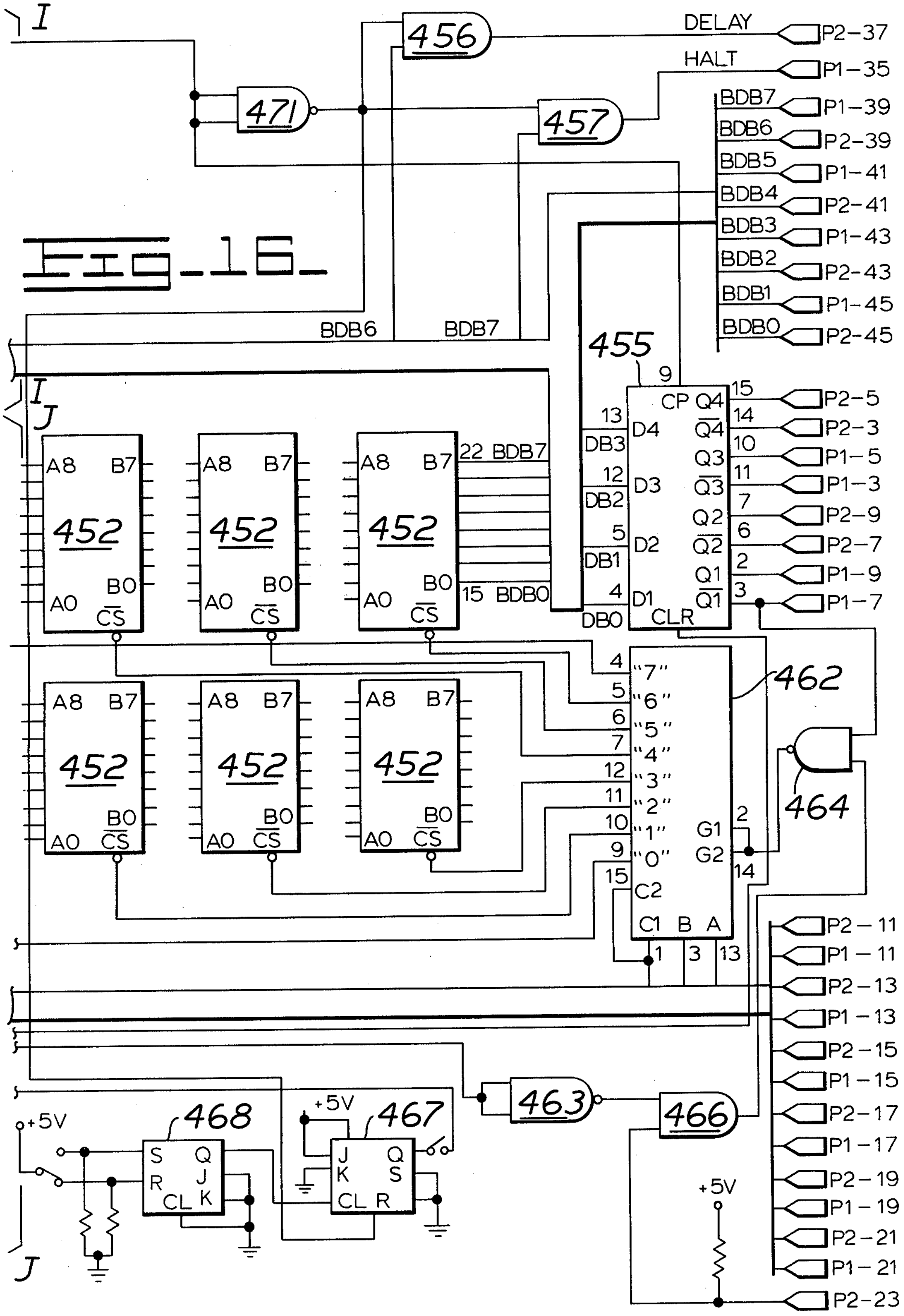
FIG. 16 is a partial schematic diagram of the circuitry of unit 2B of FIG. 2 and is connected to FIG. 14 at line I—I and to FIG. 15 at line J—J.

Referring to FIGS. 4, 11 and 13, the outputs 362, 364 of the first and second gates 310, 312 are connected to analog switches 366, 368 which are controlled by flag signals F1, F0 from the fourth unit 88 (FIGS. 1 and 15). The switches 366, 368 have a common output 370 coupled to +5VDC by a resistor 372. The common output 370 is connected to a monostable multivibrator 374 which produces a positive pulse having a duration of 10 microseconds to an AND gate 375.

The flag signals F0, F1 from the fourth unit 88 are level translated from 0,+5VDC to −7,+5VDC using a transistor array 376. The flag signals F0, F1 clock the monostable 374 to produce the pulse at the rising edge of the timing signal (FIG. 3). The flag signals F0, F1 are connected to an OR gate 378 which is connected to the AND gate 374. The AND gate 375 is connected to another OR gate 380.

The pressure signal which is the output 382 of the third gate 314 is received by a monostable 384 which has a 20 millisecond time period that prevents secondary pressure pulses that exceed a preselected value from falsely triggering the timing indicator 10. The pulse from the monostable 384 is gated through an AND gate 386 by a flag signal f2.

AND gates 375, 386 are gated through the OR gate 380 which produces the digitized timing signal (FIG. 3). When flag signal F0 goes positive, representing a logic 1, analog switch 368 connect the flywheel hole signal 38 to the output 370 which is also a logic 1. The monostable 374 delivers a logic 1 to the AND gate 375 and F0 enables OR gate 378 to deliver a logic 1 to the AND gate 375. The logic 1 from gate 375 enables OR gate 380 which provides logic 1 output. Similarly, a positive flag signal F1 causes OR gate 380 to provide a logic 1 representing the camslot signal 40. A positive flag signal F2 allows the OR gate 380 to represent the pressure signal as a logic 1. By this construction, the timing signals 38, 40, 44 are represented by positive pulses of very short duration, that is digital pulses, which are not proportional to the signals they represent. Since the pulses are of short duration, and the timing signals 38, 40, 44 occur at different times, and two flag signals F0,F1; FO,F2; or F1,F2 can be used at any one time. By this construction, any two of the timing signals 38,40; 38,44; or 40,44 can be represented by a single logic signal from the OR gate 380. The two flag signals to be used are chosen by operation of one of the pushbutton switches 54, 56, or 58.

A flip-flop 388 is coupled to the monostable 384 to be set by the pressure pulse 44 and is connected to the first gate 310 to be reset by the flywheel hole pulse 38. The flip-flop 388 provides a square wave pulse proportional to timing in mode A for use with an oscilloscope or the like for diagnostic purposes as this may be desirable from time to time.

The reference signal 36 is converted to a series of positive pulses by the fourth zero crossing detector 116, one pulse occurring for each flywheel tooth 26 (FIG. 3). Since the fourth gate 316 triggers off the leading edge of the pulse, which occurs at the center of the space between the teeth, the duration of the pulse does not matter, nor does wear of the teeth 26. The reference signal 36 is effectively digitized along with the timing signals 38, 40, 44.

By receiving the reference and timing input signals 36, 38, 40, 44, generating digital reference and timing pulses 124, 118, 120, 122 in response to the input signals reaching the zero crossover portion 48 during the transition from the negative portion 46 to the positie portion 50 and using digital circuits to extract information from the digitized signals, a full scale range of 360 degrees is obtained while maintaining 0.1 degree resolution. The timing indicator 10 and transducers 34,42 have a combined measured accuracy of ± 0.16 degree crank angle in mode A, ± 0.39 degree in mode B and ± 0.41 degree in mode C so that the scale 12 reads true to within ± 0.1 degree or 0.006%. The measured accuracy of the circuitry of the timing indicator 10 alone is ±0.1 degree.

Figure 6:
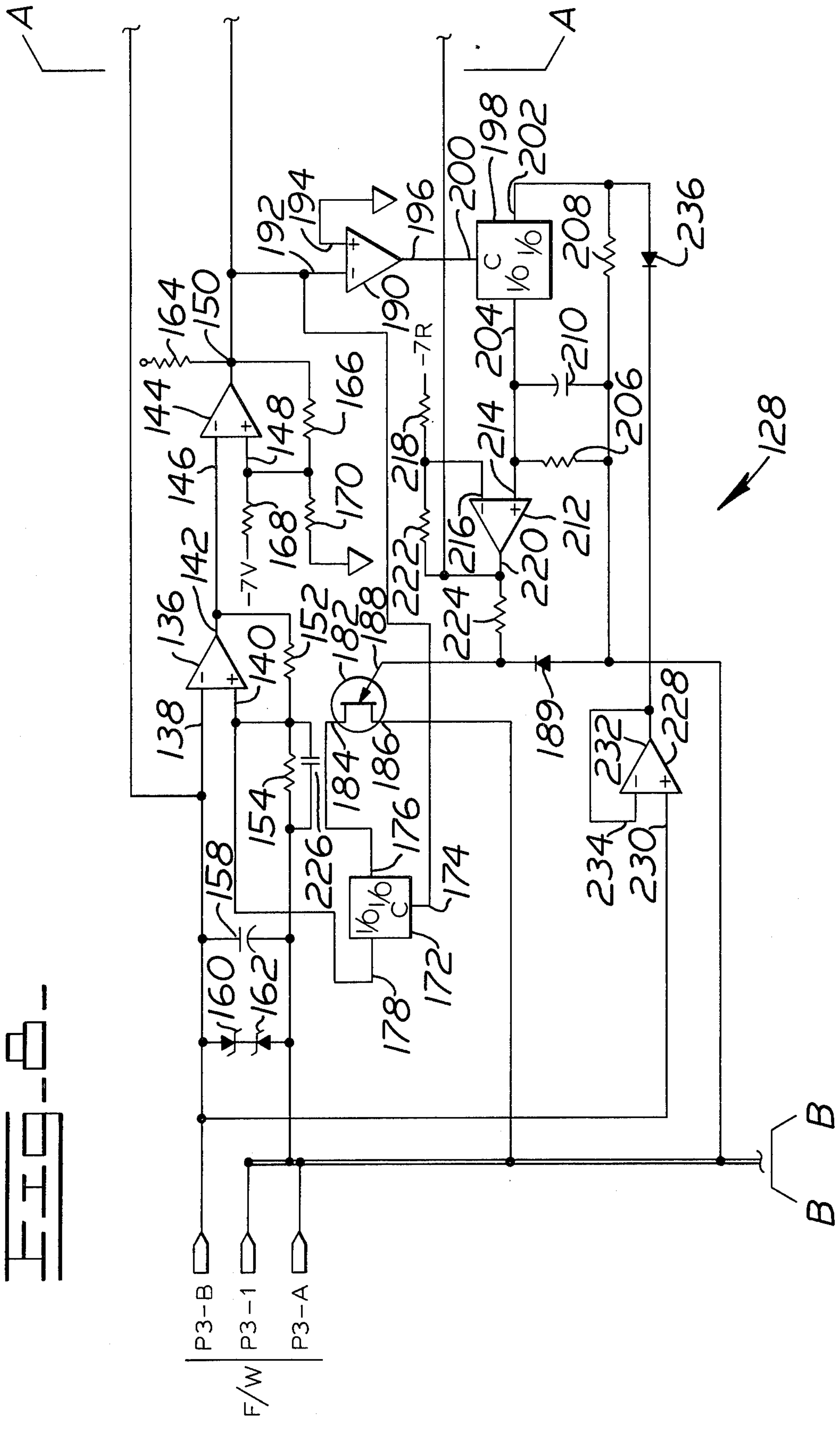
FIG. 6 is a block diagram of unit 2C of FIG. 2.
Figure 17:
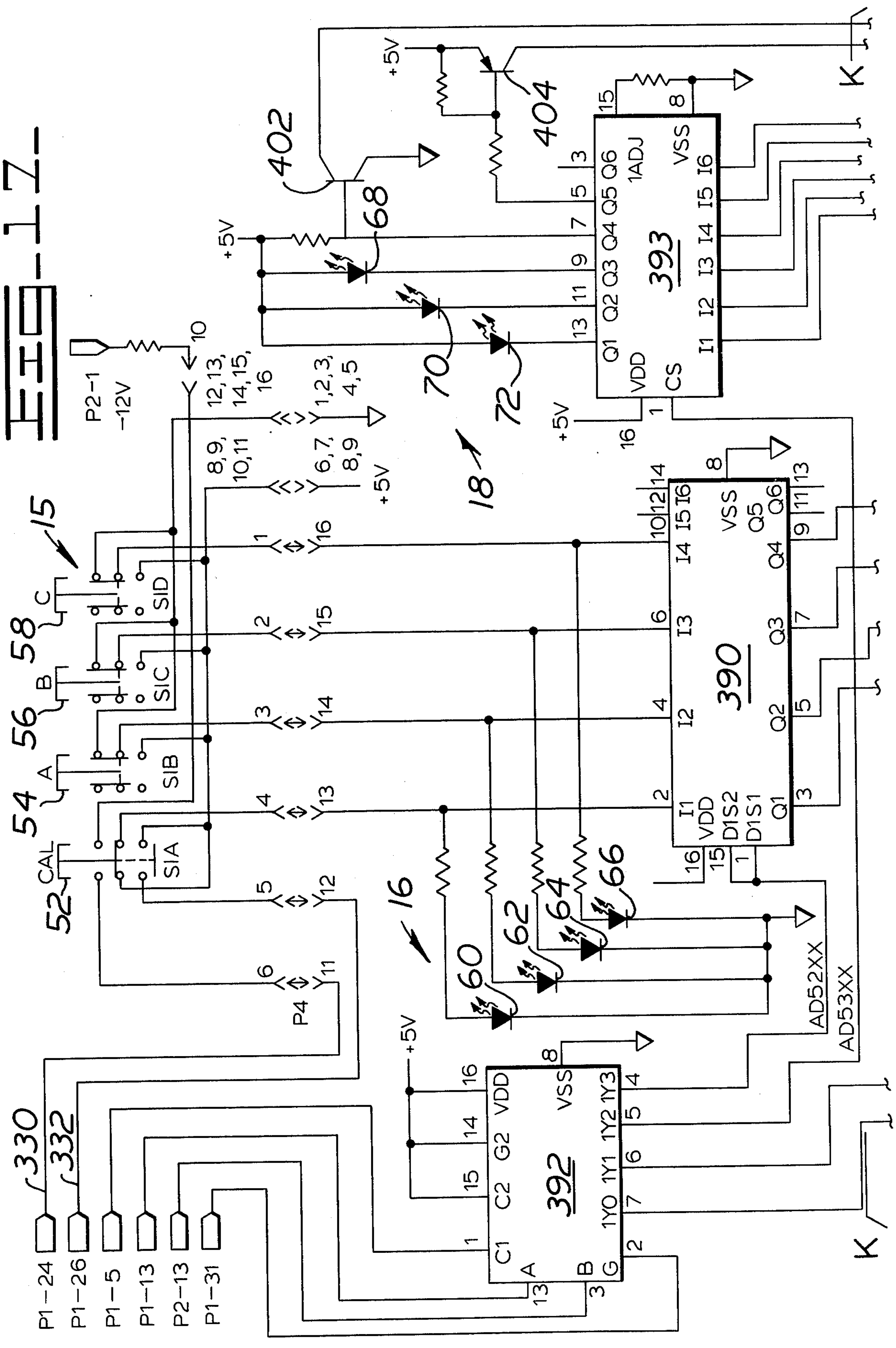
FIG. 17 is a partial schematic diagram of the circuitry of unit 2C of FIG. 2.
Figure 18:
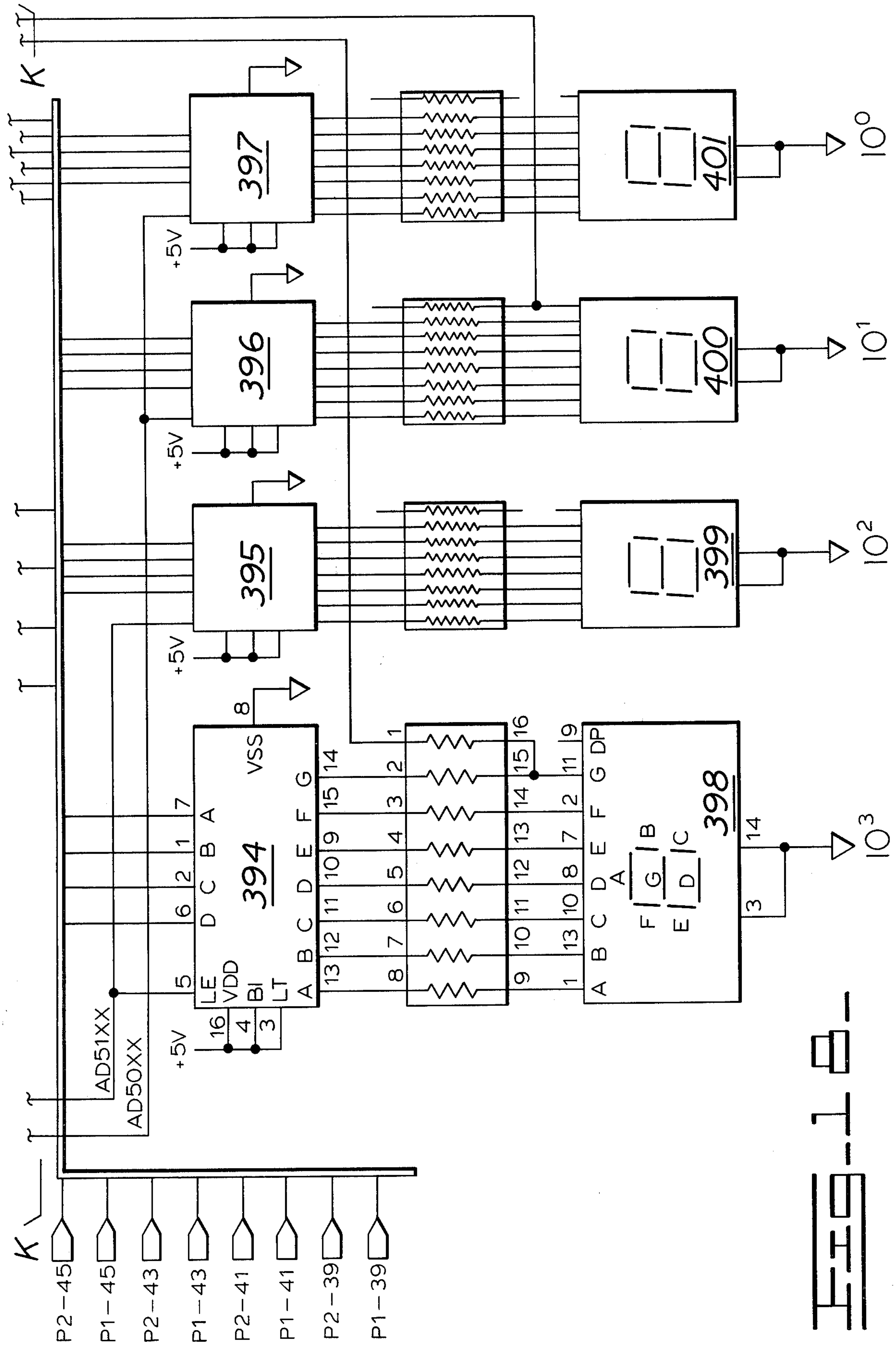
FIG. 18 is a partial schematic diagram of the circuitry of unit 2C of FIG. 2 and is connected to FIG. 17 at line K—K.
Figure 19:
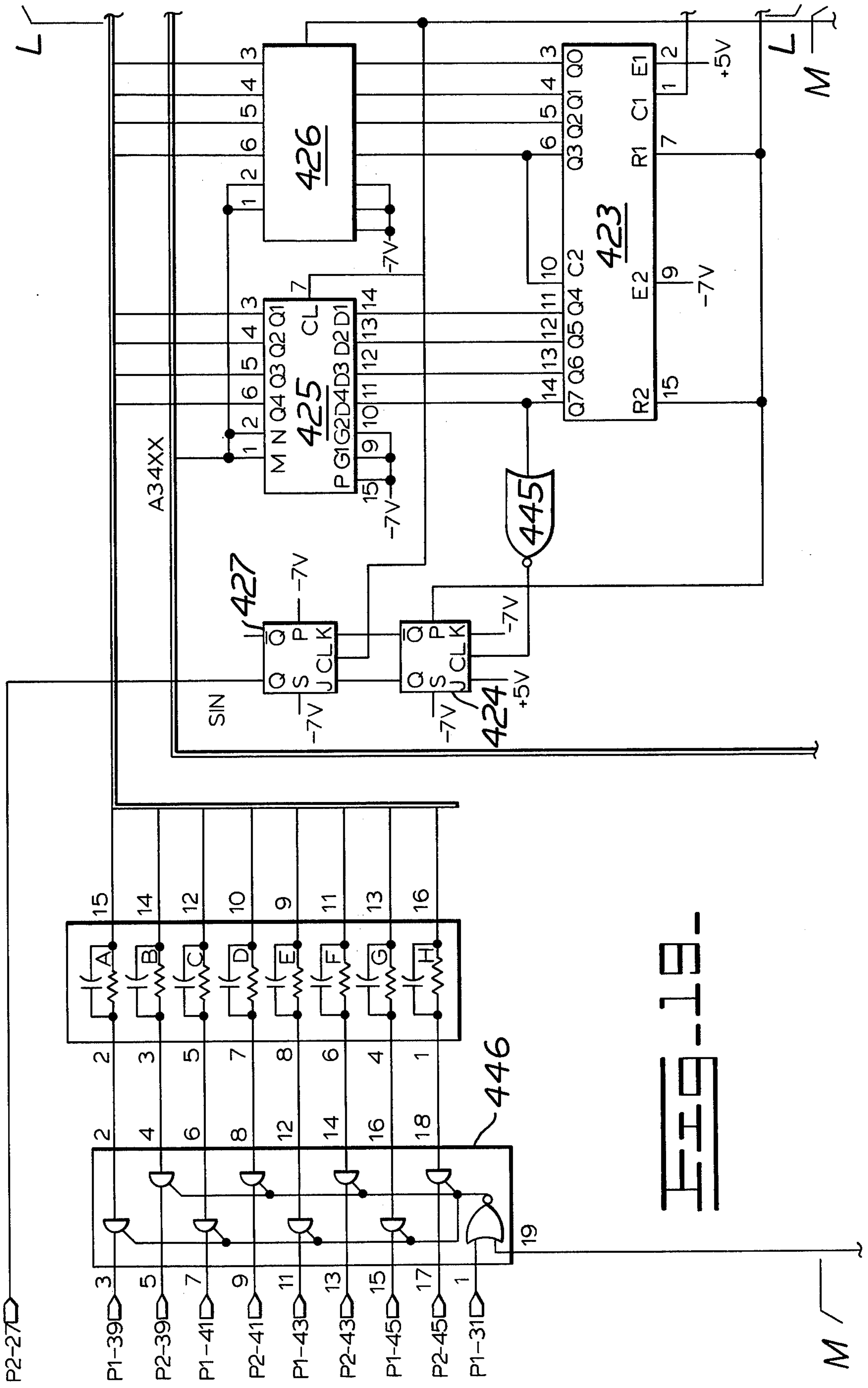
FIG. 19 is a partial schematic diagram of the circuitry of unit 2D of FIG. 2.
Figure 20:
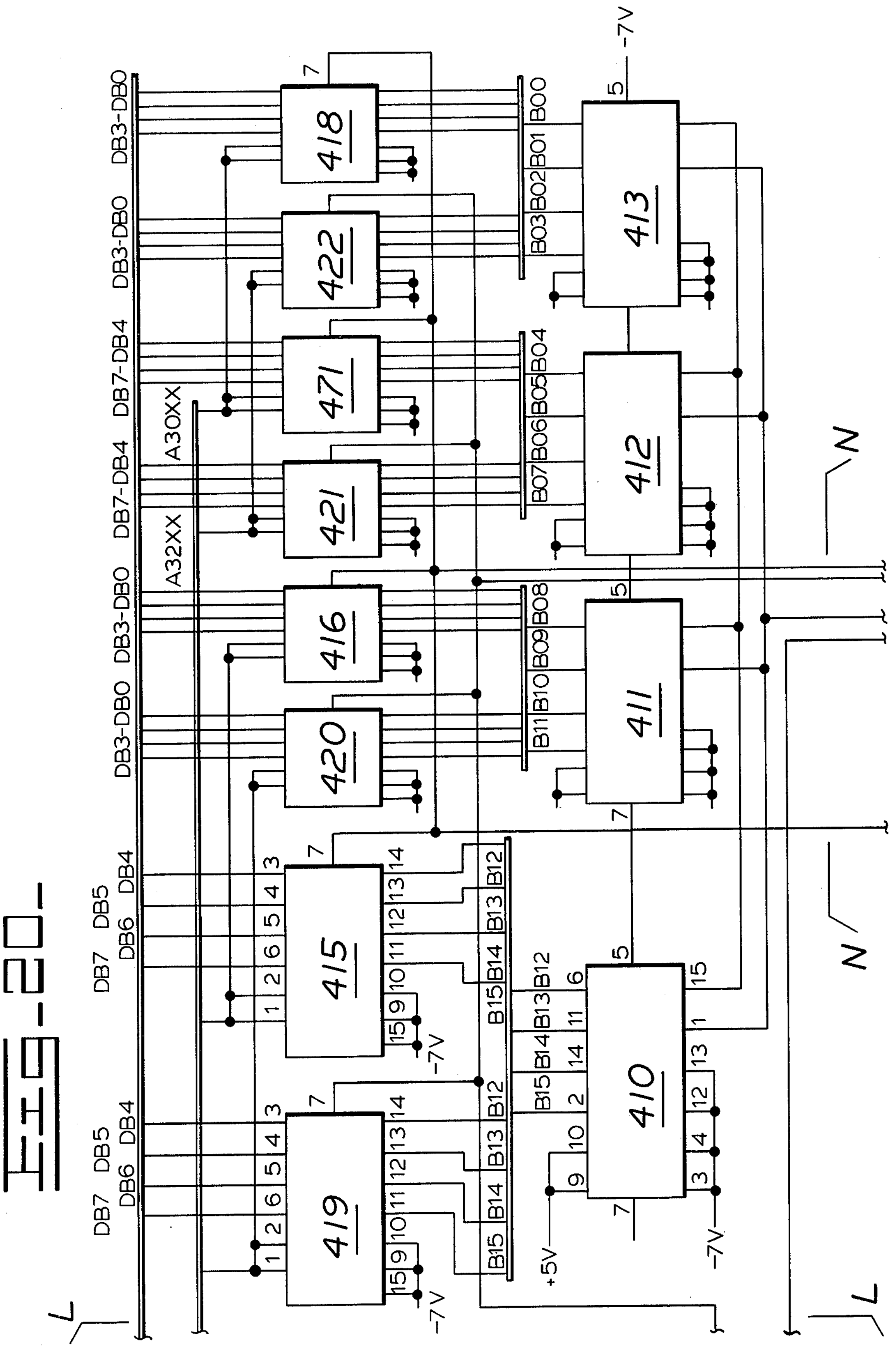
FIG. 20 is a partial schematic diagram of the circuitry of unit 2D of FIG. 2 and is connected to FIG. 19 at lines L—L.
Figure 21:
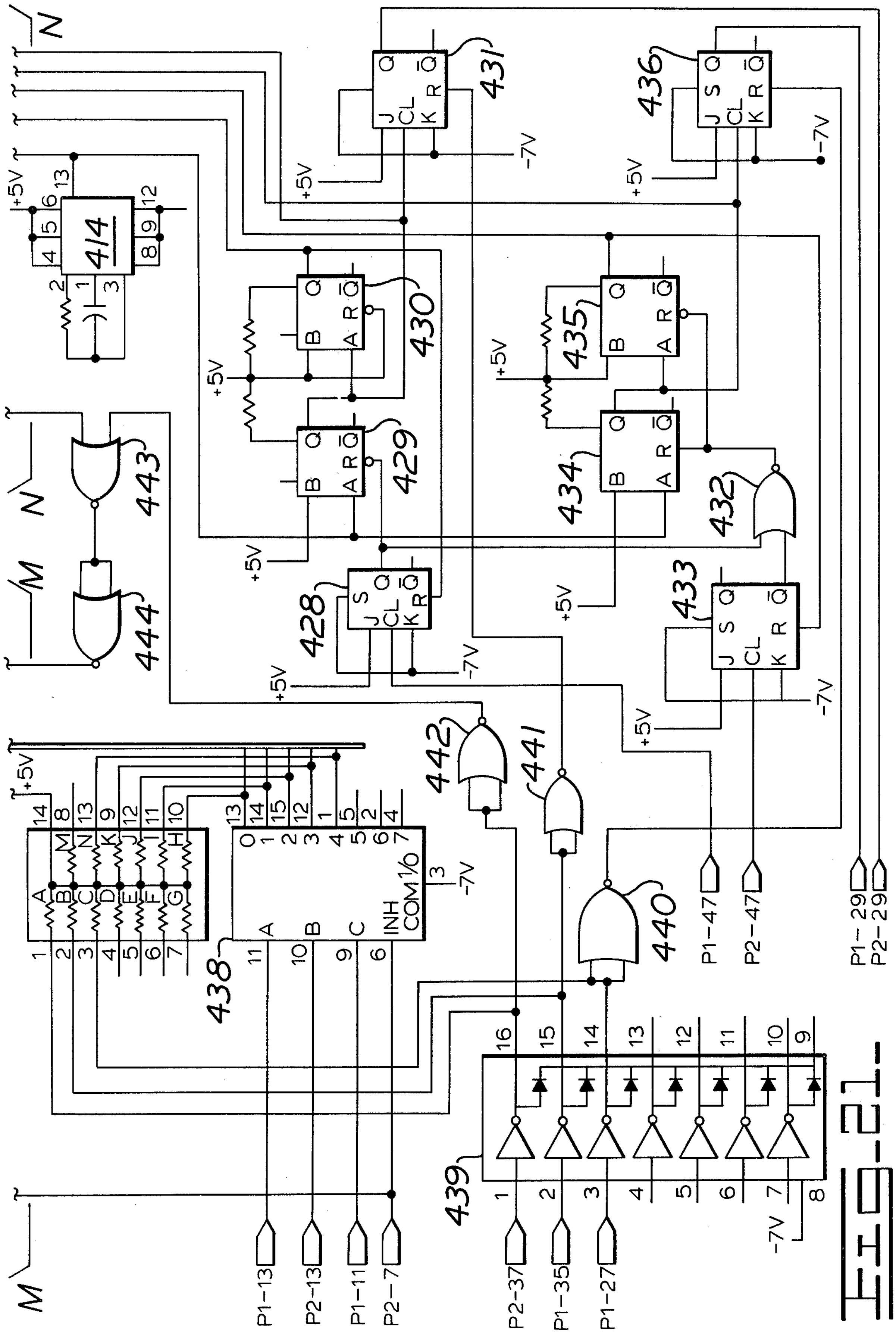
FIG. 21 is a partial schematic diagram of the circuitry of unit 2D of FIG. 2 and is connected to FIG. 19 at line M—M and to FIG. 20 at line N—N.

Referring to FIGS. 6, 17 and 18, the second unit 84 communicates with the first, third and forth units 74, 86, 88 to select two of the timing signals and display the time therebetween in degrees of reference signal generation in decimal format.

As mentioned, the mode selector 15 has four switches labeled CAL, A, B, and C and the mode indicator 16 has four LED's, 60, 62, 64, 66 which illuminate when the respective button is depressed. The mode selector 15 communicates with the fouth unit 88 through a tri-state buffer 390.

An address decoder 392 addresses the tri-state buffer 390 and a hex-latch driver 393. The driver 393 latches the failure mode indicating LED's 68, 70, 72.

The timing data is output through latch/decoder/-drivers 394, 395, 396, 397 which drive 7-segment LED displays 398, 399, 400, 401 which form the scale 12 of the timing indicator 10.

The hex-latch driver 393 also latches the minus sign on LED display 398 and the decimal point on LED display 400. The driver 393 controls transistor circuits 402, 404 which power the decimal point and minus sign respectively. By this construction, the scale 12 displays timing angles in positive and negative degrees to one decimal place.

Referring to FIGS. 7 and 19–21, the third unit 86 receives the digitized timing and reference signals from the first unit 74, counts the flywheel teeth, measures the period of the reference signal, and measures the time between the selected two digitized timing signals.

The period counting is done by four binary counters 410, 411, 412, 413 which are clocked at a 1 MHZ rate by an oscillator 414.

Tri-state latches 415, 416, 417, 418, latch the timing period when a timing mark occurs and tri-state latches 419, 420, 421, 422 latch the period between teeth each time a tooth pulse occurs. The number of flywheel teeth is counted by an 8-bit binary counter 423 which has an overflow bit 424. The counter 423 is clocked by tooth pulses and reset by timing marks. The tooth count is latched by tri-state latches 425, 426 and the overflow bit 424 is latched by latch 427. The timing marks automatically latch the tooth count or a delay instruction from the fourth unit 88 can manually latch the count.

The timing marks are synchronized with the clock 414 by first, second, third and fourth monostables 428, 429, 430, 431 which generate the latch pulse and interrupt flag Sa for the fourth unit 88. The fourth monostable 431 is connected to the second and third monostables 429, 430 and produces the interrupt flag Sa. The output of the first monostable 428 is connected to a NOR gate 432. The flywheel tooth marks are received by a flip-flop 433 which is connected to the NOR gate 432. The tooth marks are synchronized with the clock 414 through the NOR gate 432 by first, second and third monostables 434, 435, 436 which generate a latch/reset pulse and interrupt flag Sb. The third monostable 436 is connected to the first and second monostables 434, 435 and produces the interrupt flat Sb.

The various latches are addressed through an address decoder 438. DELAY, HALT and Sout codes are received from the fourth unit 88 by a lever translating transistor array 439. The Sout code is routed through NOR gate 440 to the monostable 436, and the Halt code is routed through NOR gage 441 to the monostable 431. The DELAY code is routed through NOR gate 442 to NOR gate 443 where it is joined by a signal from latches 415, 416, 417 and 418. The DELAY code then goes to NOR gate 444 and from gate 444 to latches 425, 426 and 427. The counter 423 and latch 425 are connected together at NOR gate 445 whose output is connected to the overflow bit 424.

An address decoder 446 receives coded data from the fourth unit 88, decodes it, and transfers it to the latches 415-422, 425 and 426.

Referring to FIGS. 5 and 14–16, the fourth unit 88 is a processor and memory unit. The processor 448 is preferably a SC-MP microprocessor which has a full 16-bit address. The memory 450 has at least 128 words of random access memory 451, RAM, and at least 1500 words of read only memory 451, ROM. The ROM 451 is preferably programmable. The fourth unit 88 automatically controls operation of the second and third units 84, 86 and automatically, controllably, systematically manipulates digitized data.

The fourth unit 88 is preferably a general purpose unit in that all of the microprocessor control lines are available on the main bus line 92 whether they are used or not and extra sockets are wired for expanding the ROM memory 452 to 3,584 bits. The RAM memory 451 has 256 bits available for temporary storage.

When the power switch 14 is turned on, −7VDC is applied to the processor 448. An NRST line is held low temporarily by inverter 447 to reset the processor to address 0000, The basic oscillator in the processor 448 at a 1 MHZ rate as controlled by a crystal 454 and starts the instruction sequence at a rate of 2 microseconds per machine cycle.

During the first part of each bus cycle, when the processor comes on the data bus and address bus, the address strobe is used to clock flip-flop Quad 455 to latch the high order address, AD12-AD15. The latched address AD12 is used to enable the memory 450, address AD13 enables the third unit 86, and address AD14 enables the second unit 84. During the address strobe, the DELAY and HALT flags are gated through AND gates 456, 457, The DELAY and HALT signals are used by the third unit 86 (FIG. 7) for timing control. The DELAY and HALT flags are buffered by an encoder 458 and the high order addresses, AD12-AD15 are buffered by an encoder 459. Encoder 458 buffers the lines in during read cycles and encoder 459 buffers the lines out during write cycles.

The remaining address lines, AD0-AD11, are latched by the processor 448 during the bus cycles and are buffered by address encoders 460, 461. These buffered address lines are connected to all of the memory 451, 452, to an address decoder 462, and to the main bus line.

When the memory 450 is to be addressed, a read/-write pulse is generated by NAND gates 463, 464 and AND gate 465. The pulse is gated through NAND gate 464 by the Q output of AD12 into the address decoder 462. An AND gate 465 can be used to externally disable the memory 450. When the address decoder 462 is strobed, it enables one of the memory devices depending on AD9-AD11.

FLIP-FLOPS 467, 468 are controlled by switches 469, 470, respectively for single stepping the processor 448 for troubleshooting purposes. Monostable 467 is connected to monostable 468 which in turn is connected to the output of a NAND gate 471 and to the input of AND gate 456.

The 256 word of RAM memory 451 are used as a scratch pad for calculations and temporary storage of data. All INPUT/OUTPUT to the RAM memory 451 is done by relative addressing through pointer 2, P2, which is set to point to memory location 0E49. The relative address to P2 and the absolute address for each RAM memory location is as follows.

RAM ALLOCATION

| RELATIVE ADDRESS | ABSOLUTE ADDRESS | USAGE |
|---|---|---|
| −049 | E00 | 32 Double Byte Data Points |
| −OA | E3F | (# teeth between timing marks) |
| −09 | E40 | Stack Pointer for Timing Data |
| −08 | E41 | Scratch Area for Interim Calculations |
| 00 | E49 | Scratch Area for Interim Calculations |
| +07 | E50 | Scratch Area for Interim Calculations |
| +08 | E51 | Timing Enable Word |
| 09 | E52 | TDC Enable Word |
| OA | E53 | # Teeth on Flywheel |
| OB | E54 | Timing Counts-Time Mark-High Byte |
| OC | E55 | Timing Counts-Time Mark-Low Byte |
| OD | E56 | Timing Counts-Tooth Period-High Byte |
| OE | E57 | Timing Counts-Tooth Period-Low Byte |
| OF | E58 | TDC Counts-Time Mark-High Byte |
| 010 | E59 | TDC Counts-Time Mark-Low Byte |
| 011 | E5A | TDC Counts-Tooth Period-High Byte |
| 012 | E5B | TDC Counts-Tooth Period-Low Byte |
| 013 | E5C | Tooth Count-Between Timing Marks |
| 014 | E5D | Timing Mode |
| 015 | E5E | Status Flags |
| 016 | E5F | Timing Data Sum-High Byte |
| 017 | E60 | Timing Data Sum-Middle Byte |
| 018 | E61 | Timing Data Sum-Low Byte |
| 019 | E62 | Temporary Storage-Tooth/Degree Conversion |
| 01A | E63 | Temporary Storage-Tooth/Degree Conversion |
| 01B | E64 | Temporary Storage-Tooth/Degree Conversion |
| 01C | E65 | Temporary Storage-Tooth/Degree Conversion |

-continued

| RAM ALLOCATION | | |
|---|---|---|
| RELATIVE ADDRESS | ABSOLUTE ADDRESS | USAGE |
| 01D | E66 | ¾ (# Teeth on Ring Gear) = 270° |
| 01E | E67 | Not Used |
| 01F | E68 | Timing Polarity (010 = NEG) (00 = POS) |
| 020 | E69 | Flag for First 32 Measurements |
| 021 | E6A | Timing Average - High Byte Not Used |

Figure 22:
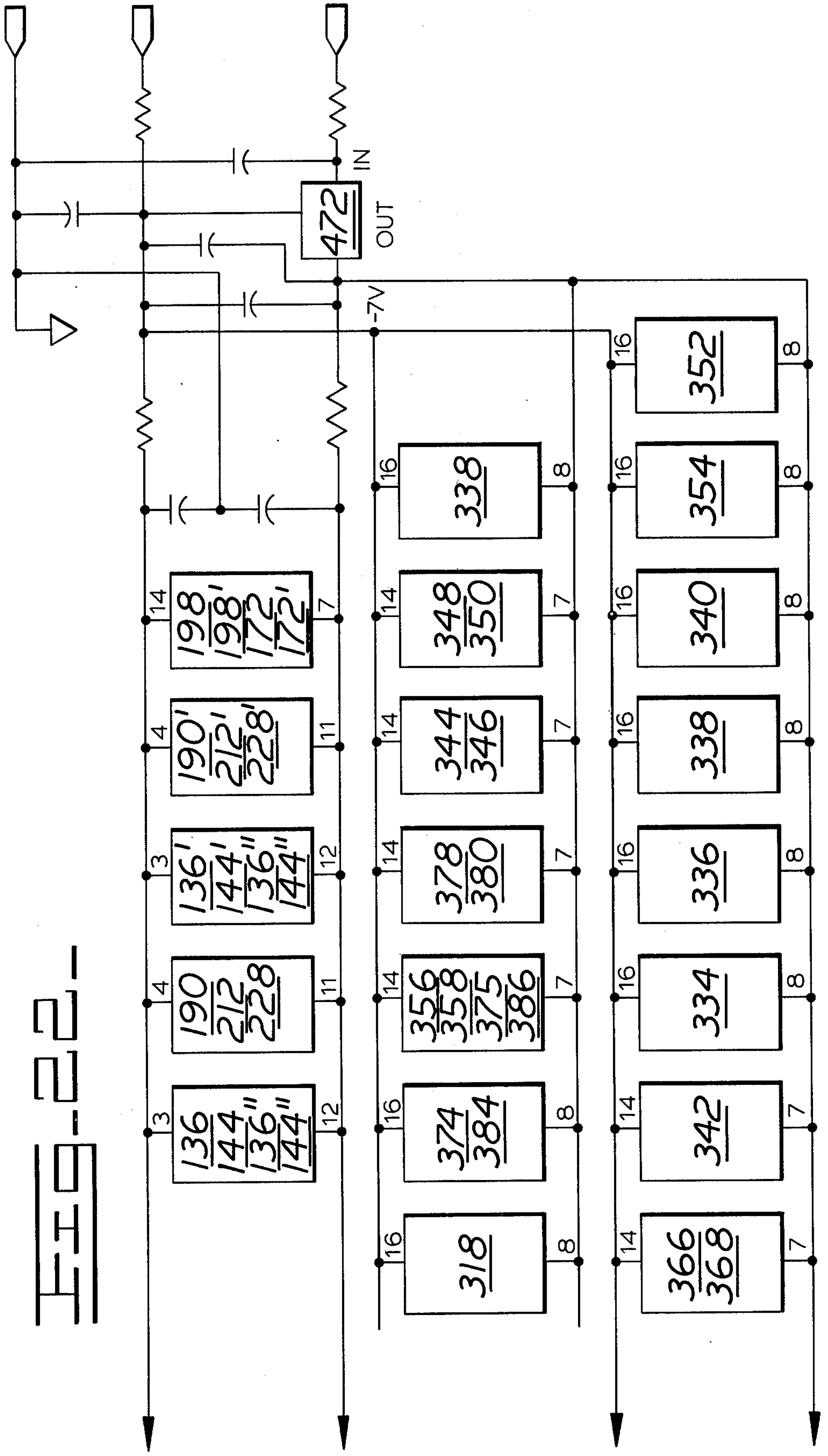
FIG. 22 is a partial schematic diagram of the power supply of FIG. 20 illustrating power connections to various elements of unit 2A.

Referring to FIGS. 2 and 22, the first unit 74 is powered on +5VDC, and −7VDC. The −7VDC 15 derived from the +5VDC,—12 VDC on the main bus 92 using a −12VDC voltage regulator 472. The −12VDC is obtained from a standard power supply or a battery, such as a vehicle battery.

Figure 23:
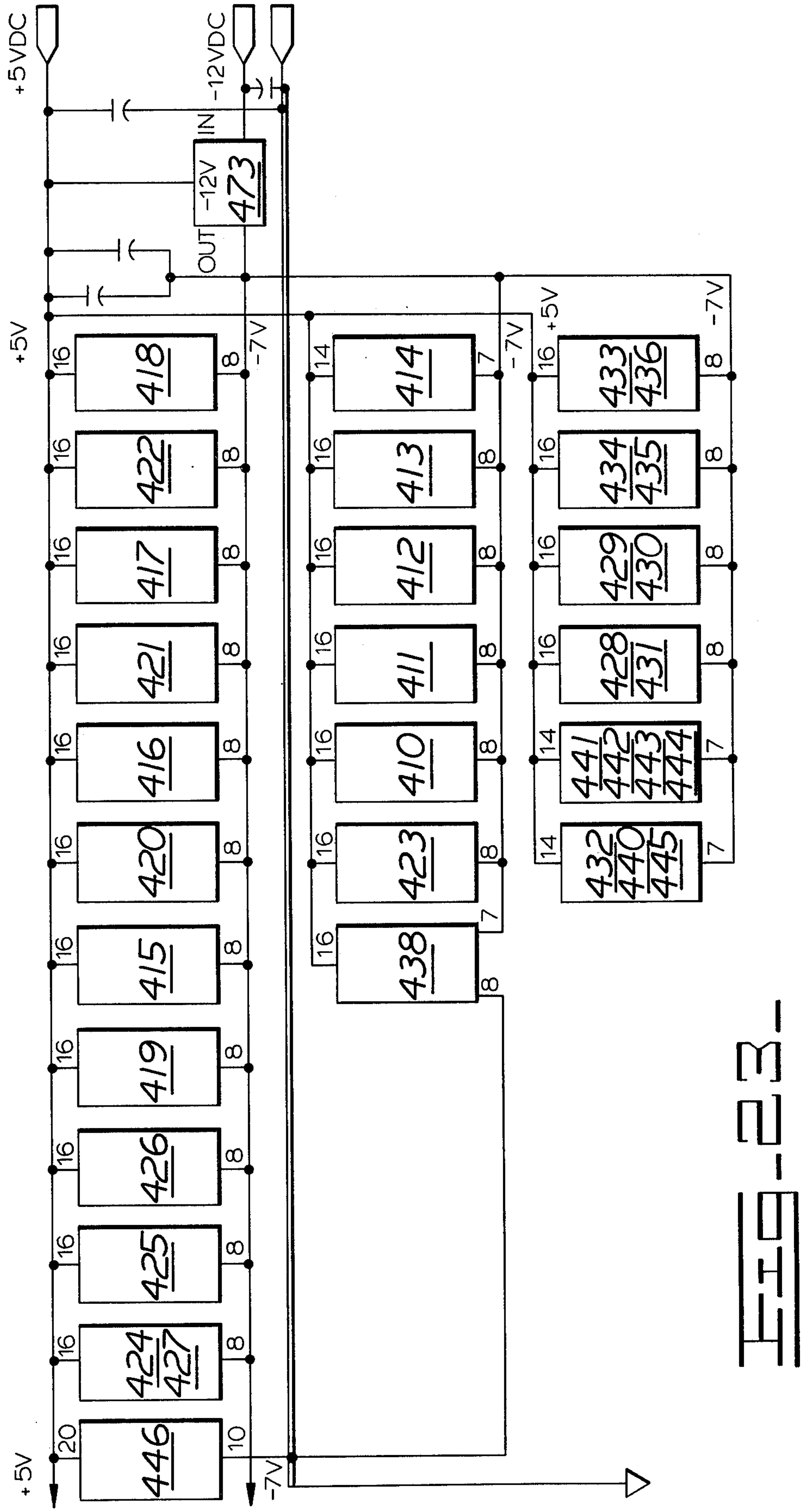
FIG. 23 is a partial schematic diagram of the power supply of FIG. 2 illustrating power connections to various elements of unit 2D.
Figure 24:
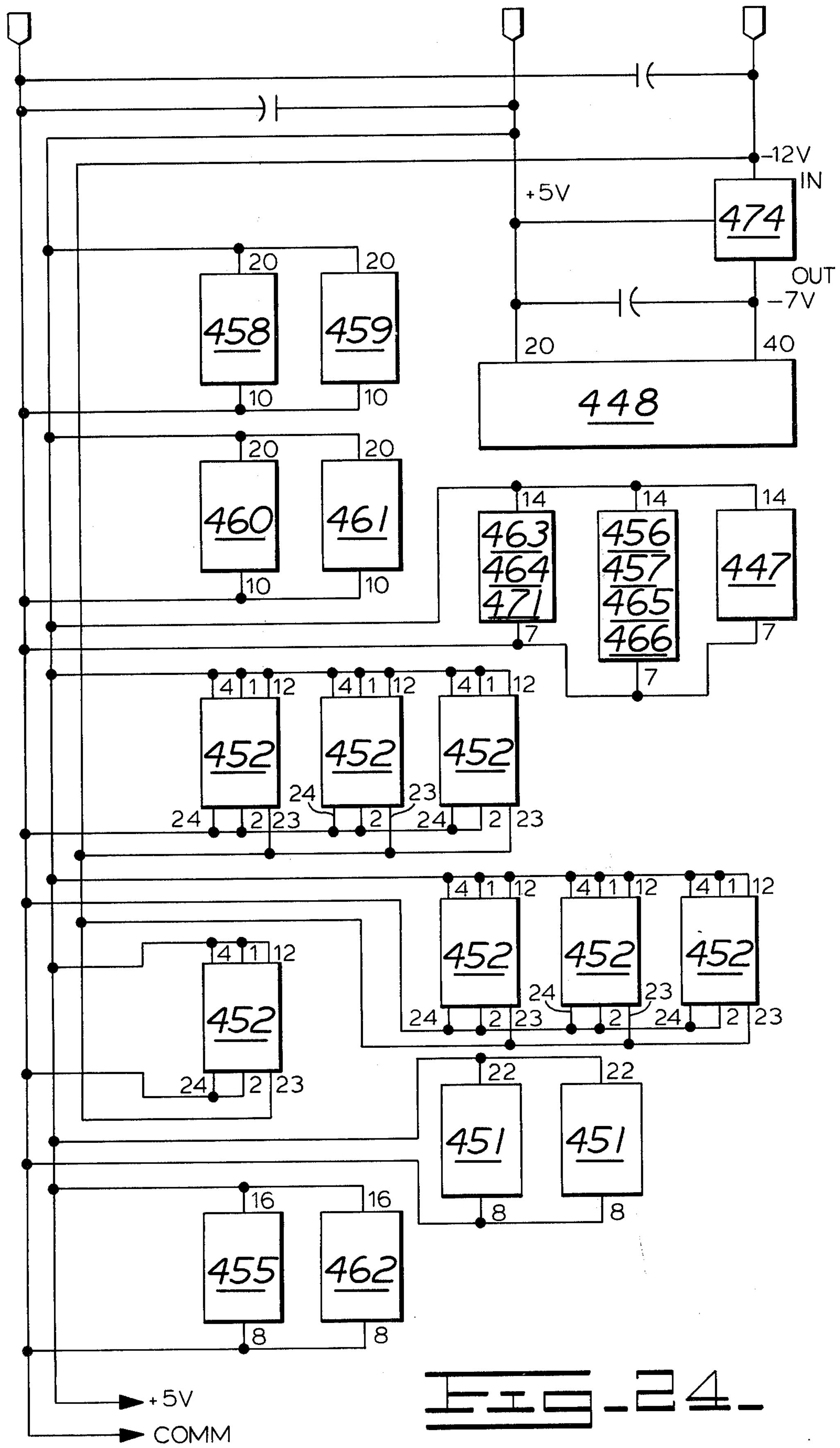
FIG. 24 is a partial schematic diagram of the power supply of FIG. 2 illustrating power connections to various elements of unit 2B.

Referring to FIGS. 2, 23 and 24, the third and fourth units 86, 88 are supplied +5VDC and −7VDC by voltage regulators 473, 474.

INPUT/OUTPUT functions performed directly from the processor flags and sense lines are defined as follows:

| I/O PORT | FUNCTION |
|---|---|
| Sa | Senses occurance of a timing mark from a latch on unit 2D. |
| Sb | Senses passing of a ring gear tooth from a latch on unit 2D. |
| Sin | Senses overflow of a tooth counter from a latch on unit 2D. |

-continued

| I/O PORT | FUNCTION |
|---|---|
| Sout | Resets the ring gear tooth latch connected to Sb, on unit 2D. |
| Halt | Resets the timing mark latch connected to Sa, on unit 2D. |
| Delay | Latches the tooth counter and overflow bit on unit 2D. |
| Flag 0 | When low, enables the camslot timing mark on unit 2A. |
| Flag 1 | When low, enables the flywheel timing mark on unit 2A. |
| Flag 2 | When low, enables the pressure timing mark on unit 2A. |

As mentioned the components, such as the operational amplifier 136, are preferably integrated circuits manufactured by National Semiconductor Corporation. The following table lists the components used in the present invention. While the components listed below are preferred, other components which have the same vital characteristics may be used.

| COMPONENT | REFERENCE NO. | MODEL NO. |
|---|---|---|
| AND GATE | 344,346,348,350 | 4082 |
| AND GATE | 356,358,375,386 | 4081 |
| AND GATE | 456,457,465,466 | 74LSO8 |
| AND/OR GATE | 318 | 4019 |
| ANALOG SWITCH | 198,198',172,172' | 4066 |
| ANALOG SWITCH | 366, 368 | 1/4 4066 each |
| Tri-State Buffer | 390 | MM80C97 |
| Counters | 334,336,338,340,354 | 4017 each |
| Counters | 410,411,412,413 | 4029 each |
| Counters | 423 | 4520 |
| Address Decoder | 392 | 74LS155 |
| Address Decoder | 438 | CD4051B |
| Decoder | 446 | DM81LS95 |
| Decoder | 462 | DM74LS155 |
| Hex Latch Driver | 393 | DM8859 |
| Encoder | 458,459,460,461 | DM81LS95 each |
| Inverter | 447 | 1/3 74LS14 |
| Latch | 415–422,425,426 | 4076 each |
| Latch/Decoder/Driver | 394,395,396,397 | 4511 each |
| RAM Memory | 451 (2 Units) | MM2101 each |
| ROM Memory | 452 (7 Units) | MM5204Q each |
| Monostable | 352 | 1/2 74C221 |
| Monostable | 360, 388 | 4027 |
| Monostable | 424, 427 | 4027 |
| Monostable | 428, 431 | 4027 |
| Monostable | 433, 436 | 4027 |
| Monostable | 467, 468 | 4027 |
| Monostable | 374, 384 | 74C221 |
| Monostable | 429, 430 | 74C221 |
| Monostable | 434, 435 | 74C221 |
| NAND GATE | 463, 464, 471 | 1/4 74LS00 each |
| NOR GATE | 432, 440, 445 | 1/4 4001 each |
| NOR GATE | 441,442,443,444 | 4001 |
| Operational Amplifier | 136,144,136'',144'' | 74C909 |
| Operational Amplifier | 136',144',136''',144''' | 74C909 |
| Operational Amplifier | 190,212,228,262 | LM324 |
| Operational Amplifier | 190',212',228',262' | LM324 |
| Op Amp | 240,240',284,284' | 74C14 |
| OR GATE | 378, 380 | 1/4 4071 each |
| Processor | 448 | SC/MP 1SP-8A/500D |
| Quad | 455 | DM74LS175 |
| Voltage Regulator | 472,473,474 | LM320MP-12 each |

| Component | Reference No. | Model No. | Manufacturer |
|---|---|---|---|
| Crystal | 454 | Y101 | Knight |
| Diode | 160-160''' | 1N4731 each | Motorola |
| Diode | 162-162''' | 1N4731 each | Motorola |
| Diode | 189,189',236,236' | 1N486 each | Motorola |
| LED | 60,62,64,66,68,70,72 | 5082-4484 each | Hewlett Packard |
| LED Display | 398,399,400,401 | 5082-7653 each | Hewlett Packard |

-continued

| | | | |
|---|---|---|---|
| Oscillator | 274, 274' | NE556 | Signetics |
| Oscillator | 342, 414 | 4047 each | RCA |
| Transistor | 402 | MPS6531 | Motorola |
| Transistor | 404 | MPS6534 | Motorola |
| Transistor Array | 376, 439 | ULN2002A each | Sprague |
| Unijunction Transistor | 188,188',252,252' | 2N1671B each | G.E. |

Operation

Referring to FIGS. 1 and 2, the timing indicator 10 is operated by connecting the timing indicator 10 to the engine 20 using the magnetic pickup units 34 and pressure transducer 42 and starting the engine 20 in the usual manner. The operator now turns on the power using the power switch 14 and selects the calibration timing mode by depressing button 52 and alternately depressing buttons 54, 56 and 58. The calibrate light 60 should illuminate and the scale 12 should indicate 120 teeth in all three modes and should then indicate 30.0 degrees for mode A, 28.5 degrees for mode B, and 1.5 degrees for mode C. When the button 52 is released, the display 12 first gives the number of teeth 26 on the flywheel 22. When the calibration and the tooth count are checked, the operator selects mode A, B or C for timing by depressing button 54, 56 or 58. One of the mode lights 62, 64 or 66 illuminate to indicate the mode selected. If all is well, the scale 12 will indicate the correct timing. If one of the timing signals is absent, the appropriate failure mode light 68, 70, 72 will illuminate. If polarity is incorrect the timing mode light 62, 64, 66 will flash. Switches mounted on the back panel are used to correct polarity. Thus, the operator simply pushes buttons and reads the scale on the front panel.

When the operator turns on the power, the timing indicator 10 initializes by clearing the memory 450, scale 12, timing mode indicator 16, failure mode indicator 18, and enabling the first unit 74 which receives the reference and timing signals 36, 38, 40, 44 and generates digital reference and timing pulses 124, 118, 120, 122 in response to the reference and timing signals substantially reaching the zero crossover portions 48. The mode selector 15 is automatically checked to determine which signals are desired. The desired signals are checked to insure that they are available. If any of the desired signals are missing, the LED indicators 68, 70, 72 are lit to alert the operator and the timing indicator 10 automatically reinitializes. If all of the desired signals are available, the flywheel teeth 26 are counted. The number of teeth 26 per revolution is stored in the memory 450 to convert the timing data to degrees.

Once the number of teeth 26 are counted the count is displayed, then a timing loop is started in which the mode selector 15 is checked to determine whether the same mode of operation is still desired. If a different mode is requested by depressing a different mode switch 52, 54, 56, 58, the timing indicator automatically reinitializes. If, however, the same mode is requested, the timing measurement is made.

Referring to FIG. 3, the timing measurement is started by measuring the period between flywheel teeth 26 while waiting for the first timing mark to occur. When the first timing mark occurs, the time from the last edge of a flywheel tooth 26 to the first timing mark is stored and the time from the last edge to the next edge of a tooth is stored. The time to the timing mark is divided by the time to the next edge of a tooth. The resulting fraction represents the timing angle as a fraction of teeth.

Timing Mark Measurement = time to timing mark/time between teeth

Once the first timing mark fraction is measured, relative to a flywheel tooth, the timing measurement is completed by counting teeth until the second timing mark occurs. At this point, the angle of the second timing mark is measured from the last tooth edge in the same manner as the first timing mark was measured.

The total timing angle, in terms of flywheel teeth, between timing marks is calculated by subtracting the first timing mark fraction from the tooth count and adding the second timing mark fraction to the tooth count.

total timing measurement in teeth = flywheel tooth count − first timing mark fraction + second timing mark fraction By measuring the period between teeth instead of the period between timing marks, a more accurate measurement of angle is obtained because instantaneous changes in crankshaft speed caused by piston firing and shaft loads are not detected by the latter technique. Measuring the time between the timing marks assumes constant angular rotation when, in fact, torsionals of ±0.5 degrees can occur on the crankshaft. Because the desired resolution is always between two teeth regardless of how far apart the timing marks are spaced, large timing measurements can be made without the need for increased resolution on the timing marks.

Thus, the timing measurement is made by measuring the timing mark, counting teeth to top dead center, and then measuring the top dead center mark. Once the data is taken, it is combined and averaged with the last 31 data points. This average tooth count is divided by the number of teeth 26 on the flywheel 22 and then multiplied by 360 to convert the measurement to degrees. The measurement is converted from binary format to decimal format and is displayed on the scale 12.

The timing measurement is repeated until either the mode selector 15 is changed or one of the signals is lost. The data on the scale 12 is updated each injection cycle and represents an average of the last 32 timing measurements. If the engine slows down below 400 rpm or stops, the signals are treated as lost and the timing indicator 10 reinitializes.

Thus, an operator uses the timing indicator by pushing buttons and reading a single scale.

While the timing indicator 10 has been described and illustrated with reference to an engine 20, the method of operation of the timing indicator 10 may be used with any apparatus which cyclically generates an oscillating reference signal and at least first and second timing signals.

In response to turning on the power and pushing buttons the timing indicator generates digital timing pulses in response to receiving the reference and timing signals; counts the number of oscillations of the reference signal; measures a first timing fraction between a leading edge of the first timing pulse and a leading edge of the preceding reference pulse; measures a second timing fraction between a leading edge of the second timing pulse and a leading edge of the preceding reference pulse; counts the number of whole reference pulses between the leading edges of the first and second timing pulses; subtracts the first timing fraction from the count; adds the second timing fraction to the count and produces a timing measurement in reference signal oscillations; divides the timing measurement by the total number of reference signal oscillations per generating cycle, multiplying by 360 and producing a timing measurement in degrees of the generating cycle; converts the timing measurement from binary to decimal format; and displays the timing measurement between the first and second timing signals in degrees of the generating cycle.

The timing indicator 10 also automatically adds the timing measurement in reference signal oscillations to the preceding 31 timing measurements, divides by 32 and produces an average timing measurement in reference signal oscillations which is divided, multiplied, converted and displayed.

The timing indicator 10 triggers off the center of the hole or slot 24, 30, does not introduce error and uses high speed digital circuitry. The indicator 10 is portable, eliminates the guesswork or reading meter scales, and eliminates the need to monitor connections. The indicator is also a useful diagnostic tool which aids in detecting problems in the parts involved in the timing measurement.

Other aspects, objects and advantages will become apparent from a study of the specification, drawings and appended claims.

The embodiments of the invention in which an exclusive property or privilege is claimed are defined as follows:

1. A digital timing apparatus, comprising:
first means for receiving and digitizing a cyclically generated, oscillating reference signal having positive, negative and zero-crossover portions and a plurality of timing signals each having positive, negative and zero-crossover portions;
second means for selecting two of the plurality of timing signals and displaying the time therebetween in degrees of reference signal generation in decimal format;
third means for measuring the period of the digitized reference signal and measuring the time between the selected two digitized timing signals;
fourth means, coupled to the first, second and third means, for automatically controlling operation of the second and third means and automatically, controllably, systematically manipulating the digitized data.

2. A digital timing apparatus, as set forth in claim 1 wherein the first means includes
zero crossing detecting means for receiving each of the reference and timing signals, initiating reference and timing pulses in response to the respective reference and timing signals reaching a negative threshold voltage level, and terminating the pulses in response to the respective signals substantially reaching the zero-crossover portion during changing of the signals from the negative portion to the positive portion.

3. A digital timing apparatus, as set forth in claim 2, wherein the first means includes
means, connected to said zero-crossing detecting means, for automatically controlling hysteresis and maintaining the threshold voltage at a preselected value.

4. A digital timing apparatus, as set forth in claim 3, wherein the zero crossing detecting means has a reference input and an output and wherein the hysteresis control means includes
an analog switch having a control input connected to the output of the zero crossing detecting means, an output connected to the reference input of the zero-crossing detecting means, and a signal input;
a unijunction transistor having a first base connected to the signal input of the analog switch, a second base coupled to a single point ground buss, and an emitter; and
means, connected to the emitter, for controllably switching the unijunction transistor.

5. A digital timing apparatus, as set forth in claim 3, wherein the zero-crossing detecting means has a signal input, a reference input and an output and wherein the hysteresis control means includes
a first analog switch having a signal output connected to the reference input of the zero-crossing detecting means, a control input connected to the output of the zero-crossing detecting means, and a signal input;
a unijunction transistor having a first base connected to the signal input of the first analog switch, a second base connected to a single point ground buss, and an emitter;
a first diode connected to the emitter of the unijunction transistor and to the single point ground buss;
a first operational amplifier having a reference input coupled to ground, a signal input connected to the control input of first analog switch and to the output of the zero-crossing detecting means, and an output;
a second analog switch having a control input connected to the output of the first operational amplifier, and a signal input and signal output coupled one to the other;
a second operational amplifier having a reference input coupled to a negative voltage source, a signal input connected to the signal output of the second analog switch, and an output coupled to the emitter of the unijunction transistor and first diode and to the negative voltage source and reference input;
a third operation amplifier having a signal input connected to the signal input of the operational amplifier, a reference input and an output connected to the reference input, and;
a second diode connected to the output of the third operational amplifier and to the signal input of the second analog switch.

6. A digital timing apparatus, as set forth in claim 2, wherein the first means includes
means, connected to said zero-crossing detecting means, for checking the polarity of a selected one of the reference and timing signals and short-circuiting the selected signal when the positive portion occurs in time before the negative portion.

7. A digital timing apparatus, as set forth in claim 6, wherein the zero-crossing detecting means has a signal input and an output and wherein the means for checking polarity includes
a first operational amplifier having a signal input connected to the signal input of the zero-crossing detecting means, a reference input, and an output coupled to the reference input and a positive voltage source;

a second operational amplifier having a signal input, a reference input coupled to ground, and an output connected to the output of the zero-crossing detecting means; and an oscillator having an input coupled to the output of the first operational amplifier and an output connected to the signal input of the second operational amplifier.

8. A digital timing apparatus, as set forth in claim 7, including a unijunction transistor having a first base connected to the reference input of the first operational amplifier, a second base connected to ground, and an emitter coupled to ground; and an operational amplifier having an output and reference input both connected to the emitter and a signal input coupled to said first means.

9. A digital timing apparatus, as set forth in claim 2, wherein the zero-crossing detecting means includes a first operational amplifier having a signal input for receiving one of the reference and timing signals, a reference input coupled to a single point ground buss, and an output coupled to the reference input;

a second operational amplifier having a signal input connected to the output of the first operational amplifier, a reference input coupled to a negative voltage source and to ground, and an output coupled to a positive voltage source, the reference input and ground.

10. A digital timing apparatus, as set forth in claim 2, including means, connected to the zero-crossing detecting means, for limiting the reference and timing signals preselected positive and negative magnitudes.

11. A digital timing apparatus, as set forth in claim 2, including means for generating digital timing pulses in response to receiving the timing pulses.

12. A digital timing apparatus, as set forth in claim 11 including means, connected to the digital timing pulse generating means, for simulating the reference and timing pulses.

13. A digital timing apparatus, as set forth in claim 11 including means for generating a square wave pulse which is proportional to timing in response to receiving the reference and timing pulses.

14. A digital timing apparatus, as set forth in claim 11, including a plurality of analog switches each having an input for receiving a respective one of the plurality of timing pulses, an output and a control input, said output of each analog switch being connected to the output of the other analog switches;

means, connected to the outputs of the analog switches, for producing a pulse of preselected width in response to receiving a pulse from one of the analog switches; and means, connected to the control input of the analog switches, for controllably closing a selected two of the switches which are connected to the two signals between which the time is to be measured.

15. A digital timing apparatus, as set forth in claim 1 wherein the second means includes means for selecting two of the timing signals between which timing is to be measured.

16. A digital timing apparatus, as set forth in claim 15 wherein the selecting means selects between the timings signals and a simulated timing signal.

17. A digital timing apparatus, as set forth in claim 15, including means for indicating the selected signals.

18. A digital timing apparatus, as set forth in claim 15, including means for detecting and indicating a loss of one of the timing and reference signals.

19. A digital timing apparatus, as set forth in claim 15 including means for receiving digital timing data and displaying the data in binary form.

20. A digital timing apparatus, as set forth in claim 1, wherein the fourth means includes a microprocessor having a full 16-bit address; and a memory having at least 128 words of random access memory and at least 1500 words of read only memory.

21. A multi-mode, digital, dynamic timing and diagnostic apparatus for timing and diagnosing an apparatus having a serrated rotating member which generates a reference signal and means for generating a plurality of timing signals occuring in timed relation to the reference signal, comprising:

first means for receiving the reference signal and timing signals and generating a digital timing pulse for each of the reference and timing signals;

second means, coupled to said first means, for counting the total number of serrations on the rotating member;

3rd means, coupled to said first, second and third means, for continually measuring a first timing fraction between a leading edge of a first one of the timing pulses and a leading edge of the preceding reference pulse, measuring a second timing fraction between a leading edge of a second one of the timing pulses and a leading edge of the preceding reference pulse, counting the number of whole reference pulses between the leading edges of the reference pulses, subtracting the first timing fraction from the count, adding the second timing fraction to the count and generating a timing measurement in serrations;

4th means, coupled to said fourth means, for storing the serration measurements;

5th means, coupled to said fifth means, for combining each serration measurement with a preselected number of the preceding serration measurements and producing an average serration count;

6th means for dividing the average serration count by the total number of serrations on the rotating member, multiplying by 360 and producing a timing measurement between the first and second timing signals in degrees of rotating member rotation in binary format; and 7th means for converting the timing measurement from binary format to decimal format and displaying the timing measurement.

22. A multi-mode, digital, dynamic timing and diagnostic system for diagnosing and timing an apparatus, said apparatus having means for cyclically generating an oscillating reference signal and a plurality of timing signals, comprising:

first means for initializing the system;

second means for receiving and digitizing the reference and timing signals;

third means for detecting and indicating the absence of one of the reference and timing signals and reinitializing the system;

fourth means for continually computing the time between a selected two of the timing signals as a function of the reference signal;

fifth means for storing the timing computations, receiving the nth computation, adding the nth computation to the preceding n-1 computations, and producing an average timing computation; and sixth means for displaying the average timing computation in decimal format.

23. A timing and diagnostic system, as set forth in claim 22, wherein n is 32.

24. A digital, dynamic timing apparatus for timing an engine having means for generating a reference signal in response to movement of a toothed rotating member and means for generating a plurality of timing signals, comprising:

first means for receiving the reference and timing signals and generating digital reference and timing pulses;

second means, coupled to said first means, for continually generating a digital output representing the time between a selected two of the digital timing pulses in rotating member teeth;

third means for combining each digital output with the last n digital outputs, averaging the n +1 outputs and dividing by the total number of teeth on the toothed rotating member; and fourth means for converting the divided average to degrees of toothed member rotation and displaying in decimal format.

25. An apparatus, as set forth in claim 24, wherein n is 31.

* * * * *